United States Patent
Endo

(10) Patent No.: US 8,409,783 B2
(45) Date of Patent: Apr. 2, 2013

(54) COPOLYMER, RESIN COMPOSITION, SPACER FOR DISPLAY PANEL, PLANARIZATION FILM, THERMOSETTING PROTECTIVE FILM, MICROLENS, AND PROCESS FOR PRODUCING COPOLYMER

(75) Inventor: Masayuki Endo, Tokyo (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 220 days.

(21) Appl. No.: 12/680,074

(22) PCT Filed: Sep. 29, 2008

(86) PCT No.: PCT/JP2008/067641
§ 371 (c)(1),
(2), (4) Date: Mar. 25, 2010

(87) PCT Pub. No.: WO2009/041681
PCT Pub. Date: Apr. 2, 2009

(65) Prior Publication Data
US 2010/0209847 A1 Aug. 19, 2010

(30) Foreign Application Priority Data
Sep. 28, 2007 (JP) ................................. 2007-256352

(51) Int. Cl.
G03F 7/033 (2006.01)
G03F 7/004 (2006.01)
C08F 220/00 (2006.01)

(52) U.S. Cl. ......................... 430/280.1; 526/75; 526/273

(58) Field of Classification Search ........................ None
See application file for complete search history.

(56) References Cited

U.S. PATENT DOCUMENTS

| | | | | |
|---|---|---|---|---|
| 2,604,463 | A * | 7/1952 | Bilton et al. | 526/273 |
| 4,498,540 | A * | 2/1985 | Marrocco | 166/295 |
| 5,362,597 | A * | 11/1994 | Sano et al. | 430/191 |
| 5,530,036 | A * | 6/1996 | Sano et al. | 522/79 |
| 5,576,406 | A * | 11/1996 | Yamamura et al. | 526/320 |
| 6,399,267 | B1 * | 6/2002 | Nishimura et al. | 430/192 |
| 6,403,215 | B1 * | 6/2002 | Kondo et al. | 428/345 |
| 7,161,022 | B2 * | 1/2007 | Itoh et al. | 560/53 |
| 2003/0193624 | A1 * | 10/2003 | Kobayashi et al. | 349/42 |

FOREIGN PATENT DOCUMENTS

| | | |
|---|---|---|
| CN | 1238367 A | 12/1999 |
| EP | 0959117 A1 | 11/1999 |
| JP | 63-66152 a * | 4/1988 |
| JP | H06-029043 | 2/1994 |
| JP | H06-43643 | 2/1994 |
| JP | H11-335655 | 12/1999 |
| JP | 3520520 | 4/2004 |
| JP | 2006-83248 | 3/2006 |
| JP | 2006-308612 | 11/2006 |
| JP | 2007-171572 | 7/2007 |

OTHER PUBLICATIONS

Infrared Absorption Frequencies, http://chemistry.umeche.maine.edu/CHY251/IR-Table.html, pp. 1-5 obtained from internet.*
Hughes et al "Reaction of Methylal with some acid Anhdrides" Journal of the American Chemical Society vol. 76 pp. 5161 Journal 1954 CODEN: JACSAT ISSN: 0002-7863.*
English abstract and record of JP 06029043 a publication date Feb. 4, 1994, from SciFinder database with Accession No. 1994:275415 CAN 120:275415, in CAPLUS, 3 pages.*
English translation of JP, 06-029043, A (1994) from machine translation from AIPN Japan Patent Office National Center for Industrial Property Information and Training, generated Feb. 27, 2013, 31 pages.*
Notice of Reasons for Rejection issued in Korean Patent Application No. 10-2010-7006414 on Apr. 17, 2012.
International Search Report issued in corresponding PCT Application No. PCT/JP2008/067641, mailed Jan. 6, 2009.
Notice of Reasons for Rejection issued in corresponding Chinese Patent Application No. 200880109608.0 mailed Sep. 15, 2012.
Notice of Reasons for Rejection issued in Japanese Patent Application No. 2009-534452 on Jan. 29, 2013.

* cited by examiner

*Primary Examiner* — Cynthia Hamilton
(74) *Attorney, Agent, or Firm* — Knobbe Martens Olson & Bear LLP

(57) ABSTRACT

Without the use of a third monomer, no copolymer practicable as a base polymer for a radiation-sensitive resin composition has been obtained by copolymerizing two ingredients, i.e., a carboxylated monomer and an epoxidized monomer. A carboxylated monomer is reacted with a specific nonpolymerizable compound, and this reaction mixture is then copolymerized with an epoxidized monomer. A radiation-sensitive resin composition and a thermosetting resin composition each containing the resultant copolymer have satisfactory storage stability and are useful as a spacer for liquid-crystal display panels, etc., a planarization film for TFT elements, and a protective film for color filters.

8 Claims, 2 Drawing Sheets

COPOLYMER, RESIN COMPOSITION, SPACER FOR DISPLAY PANEL, PLANARIZATION FILM, THERMOSETTING PROTECTIVE FILM, MICROLENS, AND PROCESS FOR PRODUCING COPOLYMER

RELATED APPLICATIONS

This application is the U.S. National Phase filing under 35 U.S.C. §371 of PCT/JP2008/067641, filed Sep. 29, 2008, which designated the United States and was published in a language other than English, which claims priority under 35 U.S.C. §119(a)-(d) to Japanese Patent Application No. 2007-256352, filed Sep. 28, 2007. The contents of these applications are incorporated herein by reference in their entireties.

TECHNICAL FIELD

The present invention relates to a spacer for display panel, a planarization film, a thermosetting protective film and a microlens, and to a resin composition containing a copolymer useful for these applications.

BACKGROUND ART

In order to keep constant a space (cell gap) between two substrates in liquid crystal display panels, spacer particles such as glass beads and plastic beads having a predetermined particle diameter have been conventionally used; in recent years, processes for forming a columnar spacer by photolithography using a radiation-sensitive resin composition have been employed.

Furthermore, radiation-sensitive resin compositions have often been used for forming TFT element planarization films of a transparent insulative film formed between a thin film transistor (TFT) and a transparent electrode of liquid crystal display panels or protective films to prevent damage or degradation of color filters and also to coat steps between pixels of color layers.

Furthermore, radiation-sensitive resin compositions have been used for forming microlenses as imaging optics of on-tip color filters of facsimiles, electronic copiers, solid-state image sensor, etc. or as optical materials of optical fiber connectors.

It is required that the resin films, formed form these radiation-sensitive resin compositions, have the property of solubility in a developer of an alkaline aqueous solution and also, after curing through development, the property of alkali resistance. Therefore, it has been heretofore publicly known that such requirement can be satisfied by including as essential substituents a carboxyl group of an alkaline-soluble group and an epoxy group that reacts with the carboxyl group to lose alkaline solubility and to gain curability itself upon heating.

At first, mixture systems of a polymer soluble in an alkaline aqueous solution (carboxyl group-containing polymer) and a resin having a substituent reactive with the carboxyl group (epoxy group, etc.) have been used as the resin compositions containing the carboxyl and epoxy groups as essential substituents; however, the radiation-sensitive resin compositions containing these resin compositions as a base polymer are unsatisfactory for resolution and taper shape of patterns when developing by alkaline aqueous solution, therefore, the improvement has been demanded. In order to improve these problems, efforts have been made to develop a polymer having carboxyl and epoxy groups in one polymer chain. However, two-component copolymers of carboxylated monomer and epoxidized monomer have been unsuccessful due to gelatinization caused by the reaction between the carboxyl group and epoxy group during polymerization reaction. As a result of further trials, a polymer having both carboxyl and epoxy groups in one molecule has been completed by using a monomer other than the two kinds of monomers as a third monomer in order to suppress the reaction between the carboxyl group and epoxy group, and a radiation-sensitive resin composition is attained by containing the polymer including a third component as a base polymer (see Patent Document 1). The resin composition of this type has been still widely used for spacers of liquid crystal display panels (see Patent Document 2), TFT element planarization films (see Patent Document 3), and protective films for color filter (see Patent Document 4).

Patent Document 1: Japanese Unexamined Patent Application No. H06-43643
Patent Document 2: Japanese Unexamined Patent Application No. 2006-308612
Patent Document 3: Japanese Unexamined Patent Application No. 2007-171572
Patent Document 4: Japanese Unexamined Patent Application No. 2006-83248

DISCLOSURE OF THE INVENTION

Problems to be Solved by the Invention

However, it has not been reported yet that a copolymer practicable as a base polymer of the radiation-sensitive resin composition is obtained by copolymerization of two monomers of a carboxylated monomer and an epoxidized monomer without using the third monomer. Moreover, if the third component exists in the polymer, a part of carboxy group tends to react with the epoxy group, thus it is difficult to obtain a reproducible copolymer to cause a reason of fluctuation of properties such as sensitivity in particular after preparation of the radiation-sensitive resin composition, which has been a practical problem.

The present invention has been made in view of the problems described above; it is an object of the present invention to synthesize a copolymer practicable as a base polymer of the radiation-sensitive resin composition and a thermosetting resin composition from two monomers of a carboxylated monomer and an epoxidized monomer, thereby to develop a material with higher cross-link density, and to provide the radiation-sensitive resin composition and the thermosetting resin composition useful for forming spacers for liquid crystal display panels, TFT element planarization films, color filter protective films, and microlenses.

Means for Solving the Problems

The present inventors have thoroughly investigated to attain the object described above, and as a result have found that a two-component copolymer can be obtained without gelatinization during polymerization by reacting a carboxylated monomer with a specific nonpolymerizable compound and then copolymerizing the reacted mixture and an epoxidized monomer, and have found that the radiation-sensitive resin composition and the thermosetting resin composition containing the resulting copolymer exhibit excellent storage stability and are useful for spacers for liquid crystal display panels, TFT element planarization films, color filter protective films, and microlenses, thereby completing the present invention.

That is, a copolymer of the present invention is characterized by containing a constitutional component derived from (a1) and a constitutional component derived from (a2) below:

(a1) a reaction mixture between an ethylenically unsaturated carboxylic acid and/or an ethylenically unsaturated carboxylic acid anhydride and at least one reactive compound selected from the group consisting of the compounds expressed by general formulae (I), (II) and (III) below, $$R^1\text{—}O\text{—}R^3\text{—}O\text{—}R^2 \quad \text{(I)}$$

wherein, $R^1$ and $R^2$ each independently represent an alkyl group having 1 to 4 carbon atoms, and $R^3$ represents a linear or branched hydrocarbon group having 1 to 4 carbon atoms which may contain an oxygen atom,

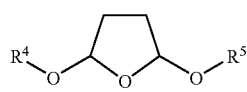
(II)

wherein, $R^4$ and $R^5$ each independently represent an alkyl group having 1 to 4 carbon atoms,

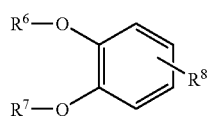
(III)

wherein, $R^6$ and $R^7$ each independently represent an alkyl group having 1 to 4 carbon atoms, and $R^8$ represents a hydrogen atom or an alkyl group having 1 to 4 carbon atoms; and (a2) an epoxidized ethylenically-unsaturated compound.

Furthermore, another copolymer of the present invention may contain a constitutional ingredient derived from an ethylenically unsaturated compound (a3) other than (a1) and (a2) described above.

A resin composition of the present invention is characterized by containing a copolymer [A] of the present invention described above and an organic solvent [B].

Another resin composition of the present invention preferably further includes a polymerizable compound having an ethylenically unsaturated bond [C] and a radiation-sensitive polymerization initiator [D].

Furthermore, another resin composition of the present invention preferably further includes a radiation-sensitive acid generator [E].

In a resin composition of the present invention, the organic solvent [B] is preferably at least one selected from the group consisting of hydroxy-carboxylate ester, alkoxy-carboxylate ester, ethylene glycol alkyl ether, diethylene glycol alkyl ether, propylene glycol monoalkyl ether, and propylene glycol ether ester.

A spacer for display panel of the present invention, a planarization film of the present invention, a thermosetting protective film of the present invention, and a microlens of the present invention are characterized by being formed from the resin composition of the present invention described above.

A process for producing a copolymer of the present invention is characterized by including a reaction step to obtain a reaction mixture (a1) by reacting an ethylenically unsaturated carboxylic acid and/or an ethylenically unsaturated carboxylic acid anhydride with at least one reactive compound selected from the group consisting of the compounds expressed by general formulae (I), (II) and (III) described above, and a polymerization step to copolymerize the resulting reaction mixture (a1) with the epoxidized ethylenically-unsaturated compound (a2).

A reaction mixture of the present invention is characterized by consisting of an ethylenically unsaturated carboxylic acid and/or an ethylenically unsaturated carboxylic acid anhydride and at least one reactive compound selected from the group consisting of the compounds expressed by general formulae (I), (II) and (III) described above.

Another reaction mixture of the present invention is characterized by having characteristic absorption around 1720 $cm^{-1}$ in infrared absorption spectra. Furthermore, another reaction mixture of the present invention is characterized by being obtained by heating to 60° C. to 150° C. and reacting the ethylenically unsaturated carboxylic acid and/or the ethylenically unsaturated carboxylic acid anhydride with the reactive compound described above.

A process for producing a reaction mixture of the present invention is characterized by allowing to react an ethylenically unsaturated carboxylic acid and/or an ethylenically unsaturated carboxylic acid anhydride with at least one reactive compound selected from the group consisting of the compounds expressed by general formulae (I), (II) and (III) described above within a temperature range of 60° C. to 150° C.

Another process for producing a reaction mixture of the present invention is characterized by allowing to react an ethylenically unsaturated carboxylic acid and/or an ethylenically unsaturated carboxylic acid anhydride with the reactive compound at a mole ratio of 1:0.5 to 1:3.

Effects of the Invention

In accordance with the present invention, a copolymer practicable as a base polymer for the radiation-sensitive resin composition and the thermosetting resin composition can be obtained from two monomers of the carboxylated monomer and the epoxidized monomer. The resin composition containing the copolymer exhibits excellent storage stability and is useful for forming spacers for liquid crystal display panels, TFT element planarization films, and color filter protective films.

PREFERRED MODE FOR CARRYING OUT THE INVENTION

1. Copolymer [A]

Figure 1:
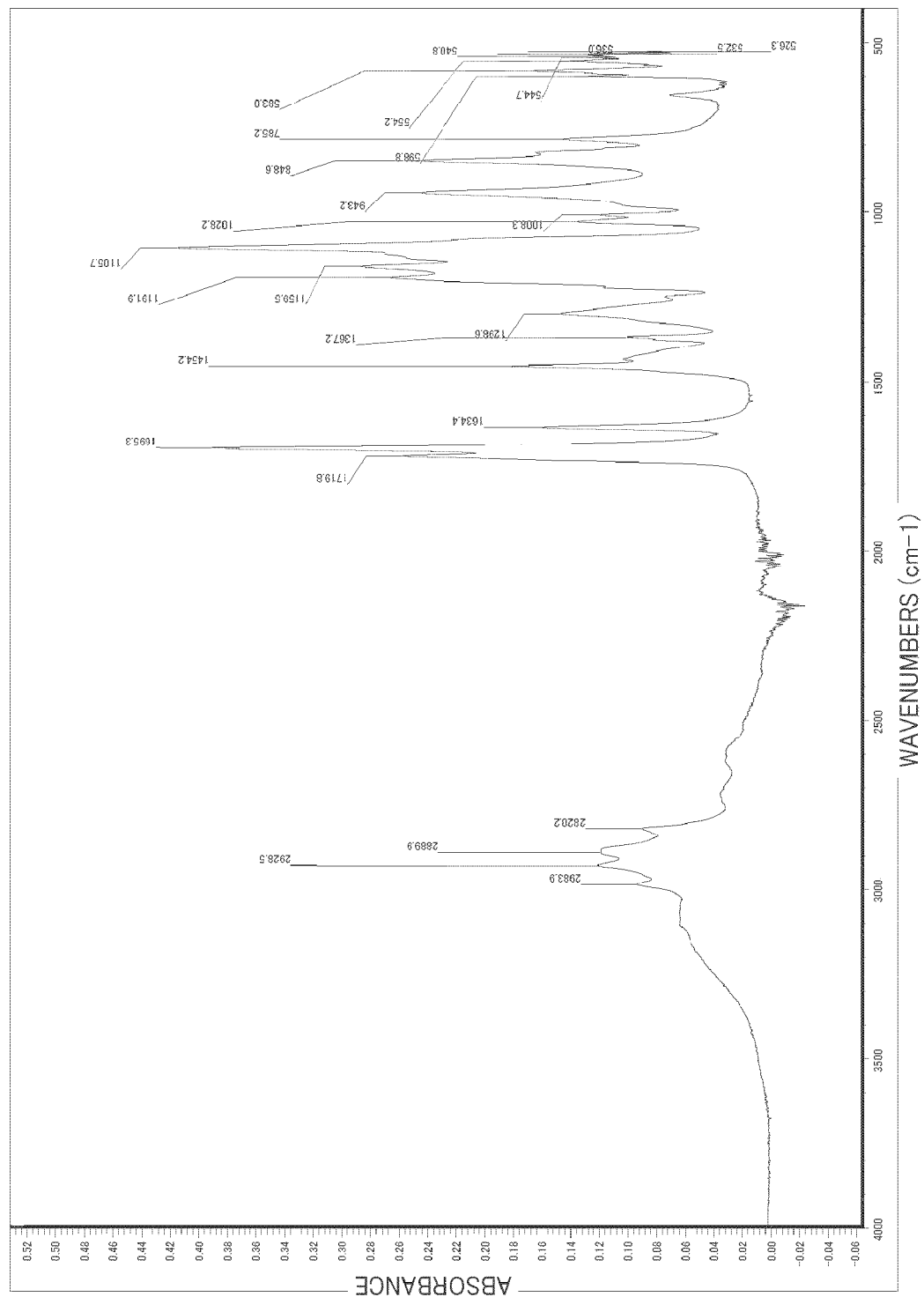
FIG. 1 is an infrared absorption spectrum (IR spectrum) of a reaction mixture (MA-1) of Preparation Example 1 of the embodiment.

A copolymer [A] of this embodiment may contain a constitutional component (a1) derived from a reaction mixture between an ethylenically unsaturated carboxylic acid and/or an ethylenically unsaturated carboxylic acid anhydride and at least one compound selected from the group consisting of the compounds expressed by general formulae (I), (II) and (III) described above and a constitutional component (a2) derived from an epoxidized ethylenically-unsaturated compound.

Examples of the ethylenically unsaturated carboxylic acid and/or the ethylenically unsaturated carboxylic acid anhydride (hereinafter, these are collectively referred to as "unsaturated carboxylic acid monomer") include monocarboxylic acids such as acrylic acid, methacrylic acid, crotonic acid, 2-methacryloyloxyethyl hydrogen succinate and 2-(methacryloyloxy)ethyl hexahydrophthalate; dicarboxylic acids such as maleic acid, fumaric acid, citraconic acid, mesaconic acid and itaconic acid; and anhydrides of the dicarboxylic acids, etc.

Among these unsaturated carboxylic acid monomers, acrylic acid, methacrylic acid and maleic acid anhydride are preferable in view of solubility of the resulting copolymer in alkaline aqueous solution and easy availability. The unsaturated carboxylic acid monomer may be used alone or in a mixture of two or more.

Examples of the compounds expressed by general formula (I) among the compounds expressed by general formulae (I), (II) and (III) described above (hereinafter, referred to as "reactive compound") include 1,2-dimethoxyethane, 1,2-diethoxyethane, 1,2-dipropoxyethane, 1,2-dibutoxyethane, diethoxymethane, dipropoxymethane, dibutoxymethane, 1,1-dimethoxypropane, 1,1-diethoxypropane, 1,1-dipropoxypropane, 1,1-dibutoxypropane, 2,2-dimethoxypropane, 2,2-diethoxypropane, 2,2-dipropoxypropane, 2,2-dibutoxypropane, diethylene glycol dimethyl ether, diethylene glycol ethyl methyl ether, diethylene glycol diethyl ether, diethylene glycol dipropyl ether, and diethylene glycol dibutyl ether.

Furthermore, examples of the compounds expressed by general formula (II) include 2,5-dimethoxytetrahydrofuran, 2,5-diethoxytetrahydrofuran, 2,5-dipropoxytetrahydrofuran and 2,5-dibutoxytetrahydrofuran.

Furthermore, examples of the compounds expressed by general formula (III) include 3,4-dimethoxytoluene, 3,4-diethoxytoluene, 3,4-dipropoxytoluene, 3,4-dibutoxytoluene, 1,2-dimethoxybenzene, 1,2-diethoxybenzene, 1,2-dipropoxybenzene and 1,2-dibutoxybenzene.

Among the compounds expressed by general formulae (I), (II) and (III) described above, diethoxymethane, 1,2-dimethoxyethane, 1,2-diethoxyethane, diethylene glycol dimethyl ether, diethylene glycol ethyl methyl ether, 2,5-dimethoxytetrahydrofuran, 1,1-diethoxypropane and 2,2-diethoxypropane are preferable in view of reactivity with the ethylenically unsaturated carboxylic acid and/or the ethylenically unsaturated carboxylic acid anhydride. These compounds may be used alone or in a mixture of two or more.

Examples of the epoxidized ethylenically-unsaturated compound (hereinafter, referred to as "epoxidized monomer") include acrylic acid epoxy alkyl esters such as glycidyl acrylate, 2-methyl glycidyl acrylate, 3,4-epoxy butyl acrylate, 6,7-epoxy heptyl acrylate and 3,4-epoxy cyclohexyl acrylate; methacrylic acid epoxy alkyl esters such as glycidyl methacrylate, 2-methyl glycidyl methacrylate, 3,4-epoxy butyl methacrylate, 6,7-epoxy heptyl methacrylate and 3,4-epoxy cyclohexyl methacrylate; α-alkyl acrylic acid epoxy alkyl esters such as α-glycidyl ethyl acrylate, α-n-glycidyl propyl acrylate, α-n-butyl acryl glycidyl and α-ethyl acrylate 6,7-epoxyheptyl; and glycidyl ethers such as o-vinyl benzyl glycidyl ether, m-vinyl benzyl glycidyl ether and p-vinyl benzyl glycidyl ether.

Among these epoxidized monomers, glycidyl methacrylate, 2-methyl glycidyl methacrylate, 6,7-epoxy heptyl methacrylate, o-vinyl benzyl glycidyl ether, m-vinyl benzyl glycidyl ether and p-vinyl benzyl glycidyl ether are preferable in view of copolymer reactivity and resin strength after curing. The epoxidized monomers may be used alone or in a mixture of two or more.

The copolymer [A] of this embodiment can be obtained by polymerizing only (a1) and (a2) as monomers. That is, such a copolymer can be obtained that both epoxy and carboxyl groups are introduced into one polymer chain and storage stability is excellent even not using a third monomer as an essential monomer as before. Furthermore, the unsaturated carboxylic acid monomers, reactive compounds, and epoxidized monomers as raw materials are easily available since these are widely used for polymer synthesis, thus the production cost can be inexpensive due to not requiring the third monomer. Moreover, crosslink density by the reaction of carboxylic acid group and epoxy group during heating and curing becomes dense and more strong cured films can be obtained.

The copolymer [A] of this embodiment may be a copolymer obtained by polymerization using further an ethylenically unsaturated compound other than (a1) and (a2) as a third monomer (a3). Here, "ethylenically unsaturated compound other than (a1) and (a2)" means an ethylenically unsaturated compound except for the ethylenically unsaturated compound (a1) contained in the reaction mixture and the epoxidized ethylenically-unsaturated compound (a2). As described above, the third monomer (a3) used for the copolymer of this embodiment is not an essential monomer, therefore, the content may be those necessary for adding an intended function to the copolymer. Furthermore, the copolymer can contain two or more types of the third monomer (a3). The copolymer [A] of this embodiment may be free from gelatinization during polymerization reaction even when containing the third monomer as a constitutional monomer, and the ranges of the content of the monomers and the condition of polymerization reaction, where the copolymer with excellent storage stability can be obtained, are remarkably improved when compared with the prior art.

Examples of the ethylenically unsaturated compound other than (a1) and (a2) include acrylic acid alkyl esters such as methyl acrylate and i-propyl acrylate; methacrylic acid alkyl esters such as methyl methacrylate, ethyl methacrylate, n-butyl methacrylate, sec-butyl methacrylate and t-butyl methacrylate; acrylic acid alicyclic esters such as cyclohexyl acrylate, 2-methyl cyclohexyl acrylate, tricyclo$[5.2.1.0^{2,6}]$deca-8-yl acrylate, 2-(tricyclo$[5.2.1.0^{2,6}]$deca-8-yloxy)ethyl acrylate and isoboronyl acrylate; methacrylic acid alicyclic esters such as cyclohexyl methacrylate, 2-methyl cyclohexyl methacrylate, tricyclo$[5.2.1.0^{2,6}]$deca-8-yl methacrylate, 2-(tricyclo$[5.2.1.0^{2,6}]$deca-8-yloxy)ethyl methacrylate and isoboronyl methacrylate; acrylic acid aryl esters or aralkyl esters such as phenyl acrylate and benzyl acrylate; methacrylic acid aryl esters or aralkyl esters such as phenyl methacrylate and benzyl methacrylate; dicarboxylic acid dialkyl esters such as diethyl maleate, diethyl fumarate and diethyl itaconate; methacrylic acid hydroxy alkyl esters such as 2-hydroxy ethyl methacrylate and 2-hydroxy propyl methacrylate; unsaturated heterocyclic five- or six-membered methacrylic acid esters containing one oxygen atom such as tetrahydrofurfuryl methacrylate, tetrahydrofuryl methacrylate and tetrahydropyrane-2-methyl methacrylate; vinyl aromatic compounds such as styrene, a-methyl styrene, m-methyl styrene, p-methyl styrene and p-methoxy styrene; conjugated diene compounds such as 1,3-butadiene, isoprene and 2,3-dimethyl-1,3-butadiene; and also acrylonitrile, methacrylonitrile, acrylic amide, methacrylic amide, vinyl chloride, vinylidene chloride, vinyl acetate, etc.

Among these, styrene, isoprene, cyclohexyl acrylate, cyclohexyl methacrylate, tricyclo$[5.2.1.0^{2,6}]$deca-8-yl acrylate, tricyclo$[5.2.1.0^{2,6}]$deca-8-yl methacrylate, etc. are preferable in view of copolymerization reactivity and solubility in alkaline aqueous solutions of the resulting copolymer. The third monomer (a3) may be used alone or in a mixture of two or more.

The content of the constitutional component derived from (a1) in the copolymer [A] is preferably 5% to 60% by mass, more preferably 10% to 40% by mass. The content of the constitutional component derived from the epoxidized monomer (a2) in the copolymer [A] is preferably 20% to 95% by mass, more preferably 40% to 90% by mass. The content of the constitutional component derived from the third monomer (a3) in the copolymer [A] is preferably 0% to 40% by mass, more preferably 0% to 20% by mass, and still more preferably 0% to 10% by mass.

The copolymer [A] has a moderate solubility in alkaline aqueous solutions and can be easily cured by heating without using together a special curing agent, therefore, can be favorably used as a base polymer of radiation-sensitive resin compositions or thermosetting resin compositions, for example.

2. Process for Producing Copolymer [A]

The process for producing the copolymer [A] of this embodiment may include a reaction step to obtain a reaction mixture (a1) by reacting the unsaturated carboxylic acid monomer with at least one compound (reactive compound) selected from the group consisting of the compounds expressed by general formulae (I), (II) and (III) described above and a polymerization step to copolymerize the resulting reaction mixture (a1) with the epoxidized compound (a2).

In the reaction step, for example, such a process is favorably used that the unsaturated carboxylic acid monomer and at least one compound (reactive compound) selected from the group consisting of the compounds expressed by general formulae (I), (II) and (III) described above are introduced into an adequate reaction vessel such as flask to heat for allowing to react while stirring.

The mole ratio of the unsaturated carboxylic acid monomer and the reactive compound, which is not specifically limited, is preferably 1:0.5 to 1:3, more preferably 1:0.8 to 1:2. When the ratio of the unsaturated carboxylic acid monomer is large, the reaction with the unsaturated carboxylic acid monomer exhibits a saturation phenomenon, and on the other hand, there arises a problem such as cost up due to an increase in the amount of the reactive compound used.

The reaction temperature, which is not specifically limited, is preferably 60° C. to 150° C., more preferably 80° C. to 120° C. When the reaction temperature is below 60° C., the reaction with the unsaturated carboxylic acid monomer is insufficient, and when above 150° C., there arise such problems as generation of sole polymerization of the unsaturated carboxylic acid and volatilization of the reactive compound.

The reaction time, which is not specifically limited, is preferably 10 minutes to 10 hours, more preferably 30 minutes to 5 hours. When the reaction time is shorter than 10 minutes, the reaction with the unsaturated carboxylic acid monomer is insufficient, and when longer than 10 hours, the reaction saturates, and on the other hand, there arises problems such decrease of productivity.

The existence of the reactant produced by the reaction step can be confirmed by measuring an infrared absorption spectrum (IR spectrum) of the resulting reaction mixture, for example. For example, the reaction mixture, produced by the reaction of methacrylic acid with at least one compound (reactive compound) selected from the group consisting of the compounds expressed by general formula (I) described above, displays an infrared absorption peak around 1720 cm$^{-1}$ which is not attributable to methacrylic acid or the reactive compound. Moreover, in the process for producing the copolymer [A] of this embodiment, the existence of the reaction product may be optionally confirmed after the reaction step, and it may be carried out as required.

The reaction mixture (a1) obtained in the reaction step may be immediately subjected to the following polymerization step or may be subjected to the polymerization step after temporary storage. The reaction mixture (a1) is extremely stable and can be stored at room temperature for a long period.

In the polymerization step, the reaction mixture (a1) obtained in the reaction step and the epoxidized monomer (a2) are copolymerized. Furthermore, the third monomer (a3) may be copolymerized together with (a1) and (a2).

The polymerization process, which is not particularly limited, is preferably a radial polymerization process, and polymerization processes such as solution polymerization process, suspension polymerization process, emulsion polymerization process and bulk polymerization process are exemplified.

In the polymerization step, the monomers are polymerized using appropriate polymerization catalysts and radical polymerization initiators. A molecular weight adjusting agent can also be used as required. Furthermore, the third monomer (a3) may be copolymerized as required.

When the reaction mixture (a1) obtained in the reaction step is immediately subjected to the polymerization step, the reaction vessel used in the reaction step may be directly used as a polymerization vessel or another polymerization vessel may be used. Furthermore, when the reactive compound used in the reaction step is usable as a polymerization solvent, the reactive compound may be directly used as a polymerization solvent. In this case, polymerization may be initiated by adding the epoxidized monomer (a2) and a radical polymerization initiator to the reaction mixture (a1) obtained in the reaction step. When the monomer (a3) or a molecular weight adjusting agent is used, polymerization may be initiated after adding them.

The polymerization solvent is preferably hydroxycarboxylate esters, alkoxycarboxylate esters, ethylene glycol alkyl ethers, diethylene glycol alkyl ethers, propylene glycol monoalkyl ethers, and propylene glycol ether esters.

Hydroxycarboxylate esters are exemplified by hydroxymethyl acetate, hydroxyethyl acetate, hydroxypropyl acetate, hydroxybutyl acetate, methyl lactate, ethyl lactate, propyl lactate, butyl lactate, methyl 3-hydroxypropionate, ethyl 3-hydroxypropionate, propyl 3-hydroxypropionate, butyl 3-hydroxypropionate, etc.

Alkoxycarboxylate esters are exemplified by methoxymethyl acetate, methoxyethyl acetate, methoxypropyl acetate, methoxybutyl acetate, ethoxymethyl acetate, ethoxyethyl acetate, ethoxypropyl acetate, ethoxybutyl acetate, propoxymethyl acetate, propoxyethyl acetate, propoxypropyl acetate, propoxybutyl acetate, butoxymethyl acetate, butoxyethyl acetate, butoxypropyl acetate, butoxybutyl acetate, methyl 2-methoxypropionate, ethyl 2-methoxypropionate, propyl 2-methoxypropionate, butyl 2-methoxypropionate, methyl 2-ethoxypropionate, ethyl 2-ethoxypropionate, propyl 2-ethoxypropionate, butyl 2-ethoxypropionate, methyl 2-propoxypropionate, ethyl 2-propoxypropionate, propyl 2-propoxypropionate, butyl 2-propoxypropionate, methyl 2-butoxypropionate, ethyl 2-butoxypropionate, propyl 2-butoxypropionate, butyl 2-butoxypropionate, methyl 3-methoxypropionate, ethyl 3-methoxypropionate, propyl 3-methoxypropionate, butyl 3-methoxypropionate, methyl 3-ethoxypropionate, ethyl 3-ethoxypropionate, propyl 3-ethoxypropionate, butyl 3-ethoxypropionate, methyl 3-propoxypropionate, ethyl 3-propoxypropionate, propyl 3-propoxypropionate, butyl 3-propoxypropionate, methyl 3-butoxypropionate, ethyl 3-butoxypropionate, propyl 3-butoxypropionate butyl 3-butoxypropionate, etc.

Ethylene glycol alkyl ethers are exemplified by ethylene glycol monomethyl ether, ethylene glycol monoethyl ether, ethylene glycol dimethyl ether, ethylene glycol diethyl ether, ethylene glycol ethyl methyl ether, etc.

Diethylene glycol alkyl ethers are exemplified by diethylene glycol monomethyl ether, diethylene glycol monoethyl ether, diethylene glycol dimethyl ether, diethylene glycol diethyl ether, diethylene glycol ethyl methyl ether, etc.

Propylene glycol monoalkyl ethers are exemplified by propylene glycol monomethyl ether, propylene glycol monoethyl ether, propylene glycol monopropyl ether, propylene glycol monobutyl ether, etc.

Propylene glycol alkyl ether esters are exemplified by propylene glycol methyl ether acetate, propylene glycol ethyl ether acetate, propylene glycol propyl ether acetate, propylene glycol butyl ether acetate, propylene glycol methyl ether propionate, propylene glycol ethyl ether propionate, propylene glycol propyl ether propionate, propylene glycol butyl ether propionate, etc.

Among these, ethyl lactate, methyl 3-methoxypropionate, ethyl 3-ethoxypropionate, propylene glycol monomethyl ether, propylene glycol methyl ether acetate, diethylene glycol dimethyl ether and diethylene glycol ethyl methyl ether are preferable in view of polymerization reactivity, copolymer solubility, coating property of resin compositions containing the copolymer. Moreover, methyl 3-methoxypropionate, ethyl 3-ethoxypropionate and propylene glycol methyl ether acetate are more preferable from the view point of safety for living bodies. The polymerization solvents may be used alone or in a mixture of two or more.

The radical polymerization initiator, which is not particularly limited, may be exemplified by azo compounds such as 2,2'-azobisisobutyronitrile, 2,2'-azobis-(2,4-dimethylvaleronitrile), 2,2'-azobis-(4-methoxy-2,4-dimethylvaleronitrile), 4,4-azobis-(4-cyanovaleric acid), dimethyl 2,2'-azobis-(2-methylpropionate) and 2,2'-azobis-(4-methoxy-2,4-dimethylvaleronitrile); organic peroxides such as benzoyl peroxide, lauroyl peroxide, t-butyl peroxypivalate and 1,1-bis (t-butyl peroxy)cyclohexane; hydrogen peroxide, etc. When peroxide is used as the radical polymerization initiator, it may be used together with a reducing agent as a redox-type initiator. These radical polymerization initiators may be used alone or in a mixture of two or more.

The molecular weight adjusting agent may be exemplified by halogenated hydrocarbons such as chloroform and carbon tetrabromide; mercaptans such as n-hexyl mercaptan, n-octyl mercaptan, n-dodecyl mercaptan, t-dodecyl mercaptan and thioglycol; xanthogens such as dimethyl xanthogen sulfide and di-1-propyl xanthogen disulfide; terpinolene, α-methylstyrene dimer, etc. These molecular weight adjusting agents may be used alone or in a mixture of two or more.

3. Resin Composition

The resin composition of this embodiment may contain a copolymer [A] and an organic solvent [B]. The polymerization solvent, used for the polymerization of the copolymer [A], can be favorably used as the organic solvent [B]. That is, hydroxycarboxylate esters, alkoxycarboxylate esters, ethylene glycol alkyl ethers, diethylene glycol alkyl ethers, propylene glycol monoalkyl ethers, and propylene glycol ether esters are preferable, among these, ethyl lactate, methyl 3-methoxypropionate, ethyl 3-ethoxypropionate, propylene glycol monomethyl ether, propylene glycol monomethyl ether acetate, diethylene glycol dimethyl ether and diethylene glycol ethyl methyl ether are preferable in view of copolymer solubility, coating property of resin compositions, etc. Moreover, methyl 3-methoxypropionate, ethyl 3-ethoxypropionate and propylene glycol methyl ether acetate are preferable from the view point of safety for living bodies. The organic solvents [B] may be used alone or in a mixture of two or more. Accordingly, when an organic solvent identical with the polymerization solvent is used as the organic solvent [B], the resin composition may be prepared by adding other ingredients to the resulting solution of the copolymer [A].

In the resin composition of this embodiment, the copolymer [A] and the organic solvent [B] are essential ingredients. The resin composition, consisting of these essential ingredients, is useful for forming thermosetting protective films. Additives such as surfactants and adhesive aids may also be added to the resin composition consisting of the copolymer [A] and the organic solvent [B]. In addition, the surfactants and adhesive aids are described later. The resin composition can be easily cured by heating without using curing agents in particular.

When the resin composition of this embodiment is used as a negative-type radiation-sensitive resin composition, a polymerizable compound having an ethylenically unsaturated bond [C] (hereinafter, referred to as "polymerizable compound [C]") and a radiation-sensitive polymerization initiator [D] are further added. The negative-type radiation-sensitive resin composition is useful for applications such as spacers for display panel. Here, "radiation-sensitive polymerization initiator" in this specification means an ingredient that generates an active species capable of initiating the polymerization of the polymerizable compound [C] by exposure of visible light, UV rays, far-UV radiation, charged particle radiation, X rays, etc.

The polymerizable compound [C], which is not particularly limited, is preferably monofunctional, difunctional, tri- or higher functional (meth)acrylic acid esters in view of proper polymerization properties and higher strength of resulting spacers. Here, "(meth)acrylic acid" means "methacrylic acid" or "acrylic acid".

The monofunctional (meth)acrylic acid esters may be exemplified by 2-hydroxy ethyl acrylate, 2-hydroxy ethyl methacrylate, diethylene glycol monoethyl ether acrylate, diethylene glycol monoethyl ether methacrylate, isoboronyl acrylate, isoboronyl methacrylate, 3-methoxy butyl acrylate, 3-methoxy butyl methacrylate, 2-acryloyloxyethyl-2-hydroxypropyl phthalate, 2-methacryloyloxyethyl-2-hydroxypropyl phthalate, etc.; the marketed products may be exemplified by Aronix M-101, M-111, and M-114 (manufactured by Toagosei Co., Ltd.); Biscoat 158, 2311 (manufactured by Osaka Organic Chemical Industry Ltd.), etc.

The difunctional (meth)acrylic acid esters may be exemplified by ethylene glycol diacrylate, ethylene glycol dimethacrylate, diethylene glycol diacrylate, diethylene glycol dimethacrylate, tetraethylene glycol diacrylate, tetraethylene glycol dimethacrylate, 1,6-hexanediol diacrylate, 1,6-hexanediol dimethacrylate, 1,9-nonanediol diacrylate, 1,9-nonanediol dimethacrylate, bisphenoxyethanol fluorene diacrylate, bisphenoxyethanol fluorene dimethacrylate, etc.; the marketed products may be exemplified by Aronix M-210, M-240, and M-6200 (manufactured by Toagosei Co., Ltd.); Biscoat 260, 312, 335HP (manufactured by Osaka Organic Chemical Industry Ltd.), etc.

The tri- or higher functional (meth)acrylic acid esters may be exemplified by trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol pentaacrylate, dipentaerythritol pentamethacrylate, dipentaerythritol hexaacrylate, dipentaerythritol hexamethacrylate, tri(2-acryloyloxyethyl)phosphate, tri(2-methacryloyloxyethyl)phosphate, etc. The marketed products may be exemplified by Aronix M-309, M-400, M-405, M-450, M-7100, M-8030, M-8060 and TO-1450 (manufactured by Toagosei Co., Ltd.); AD-TMP, ATM-4P, A-TMMT, A-DPH (manufactured by Shin-Nakamura Chemical Co. Ltd.); Biscoat 295, 300, 360, GPT, 3PA and 400 (manufactured by Osaka Organic Chemical Industry Ltd.), etc.

Among these monofunctional, difunctional, tri- or higher functional (meth)acrylic acid esters, tri- or higher functional (meth)acrylic acid esters are preferable; in particular, trimethylolpropane triacrylate, pentaerythritol triacrylate, pentaerythritol tetraacrylate, dipentaerythritol pentaacrylate and dipentaerythritol hexaacrylate are preferable. The monofunctional, difunctional, tri- or higher functional (meth)acrylic acid esters may be used alone or in a combination of two or more.

When the resin composition of this embodiment is prepared as a negative-type radiation-sensitive resin composition, the amount of the polymerizable compound [C] used is preferably 50 parts by mass to 140 parts by mass based on 100 parts by mass of the copolymer [A], more preferably 40 parts by mass to 120 parts by mass. In this case, when the amount of the polymerizable compound [C] used is below 40 parts by mass, residuals may possibly remain after development, and when above 140 parts by mass, hardness of resulting spacers tends to decrease.

The radiation-sensitive polymerization initiator [D] is exemplified by α-diketones such as benzyl and diacetyl; acyloins such as benzoin; acyloin ethers such as benzoin methyl ether, benzoin ethyl ether and benzoin isopropyl ether; benzophenones such as thioxanthone, 2,4-diethyl thioxanthone, thioxanthone-4-sulfonic acid, benzophenone, 4,4'-bis(dimethylamino)benzophenone and 4,4'-bis(diethylamino)benzophenone; acetophenones such as acetophenone, p-dimethylamino acetophenone, α,α'-dimethoxy acetoxy benzophenone, 2,2'-dimethoxy-2-phenylacetophenone, p-methoxyacetophenone, 2-methyl[4-(methylthio)phenyl]-2-morpholino-1-propane, and 2-benzyl-2-dimethylamino-1-(4-morpholino phenyl)-butane-1-one; quinones such as anthraquinone and 1,4-naphthoquinone; halogen compounds such as phenacyl chloride, tribromomethyl phenyl sulfone and tris(trichloromethyl)-s-triazine; acylphosphine oxides such as 2,4,6-trimethyl benzoyl diphenylphosphine oxide, bis(2,6-dimethoxy benzoyl)-2,4,4-trimethyl-pentylphosphine oxide and bis(2,4,6-trimethyl benzoyl)phenylphosphine oxide; and peroxides such as di-t-butyl peroxide.

The marketed products of these radiation-sensitive polymerization initiators may be exemplified by IRGACURE-184, 369, 500, 651, 907, 1700, 819, 1000, 2959, 149, 1800, 1850, Darocur-1173, 1116, 2959, 1664, 4043 (manufactured by Ciba Specialty Chemicals Inc.), etc. The radiation-sensitive polymerization initiators [D] may be used alone or in a mixture of two or more.

When the resin composition of this embodiment is prepared as a negative-type radiation-sensitive resin composition, the amount of the radiation-sensitive polymerization initiator [D] used is preferably 5 parts by mass to 30 parts by mass based on 100 parts by mass of the polymerizable compound [C], more preferably 5 parts by mass to 20 parts by mass. In this case, when the amount of the radiation-sensitive polymerization initiator [D] used is below 5 parts by mass, residual film rate tends to decrease after development, and when above 30 parts by mass, solubility of unexposed portions to alkaline developer tends to decrease during development.

When the resin composition of this embodiment is used as a positive-type radiation-sensitive resin composition, a radiation-sensitive acid generator [E] is further added to the resin composition containing the copolymer [A] and the organic solvent [B]. The positive-type radiation-sensitive resin composition is useful for applications to form planarization films, etc. In this specification, "radiation-sensitive acid generator" means an ingredient that generates an acid by exposure of visible light, UV rays, far-UV radiation, charged particle radiation, X rays, etc.

The radiation-sensitive acid generator [E], which is not particularly limited, is preferably 1,2-quinonediazido compounds. The 1,2-quinonediazido compound may be exemplified by 1,2-benzoquinone diazidosulfonic acid ester, 1,2-naphthoquinone diazidosulfonic acid ester, 1,2-benzoquinone diazidosulfonic acid amide, 1,2-naphthoquinone diazidosulfonic acid amide, etc.

Specifically, 1,2-naphthoquinone diazidosulfonic acid esters of trihydroxy benzophenone such as 2,3,4-trihydroxy benzophenone-1,2-naphthoquinone diazido-4-sulfonic acid ester, 2,3,4-trihydroxy benzophenone-1,2-naphthoquinone diazido-5-sulfonic acid ester, 2,4,6-trihydroxy benzophenone-1,2-naphthoquinone diazido-4-sulfonic acid ester, and 2,4,6-trihydroxy benzophenone-1,2-naphthoquinone diazido-5-sulfonic acid ester; 1,2-naphthoquinone diazidosulfonic acid esters of tetrahydroxy benzophenone such as 2,2',4,4'-tetrahydroxy benzophenone-1,2-naphthoquinone diazido-4-sulfonic acid ester, 2,2',4,4'-tetrahydroxy benzophenone-1,2-naphthoquinone diazido-5-sulfonic acid ester, 2,3,4,3'-tetrahydroxy benzophenone-1,2-naphthoquinone diazido-4-sulfonic acid ester, 2,3,4,3'-tetrahydroxy benzophenone-1,2-naphthoquinone diazido-5-sulfonic acid ester, 2,3,4,4'-tetrahydroxy benzophenone-1,2-naphthoquinone diazido-4-sulfonic acid ester, 2,3,4,4'-tetrahydroxy benzophenone-1,2-naphthoquinone diazido-5-sulfonic acid ester, 2,3,4,2'-tetrahydroxy-4'-methyl benzophenone-1,2-naphthoquinone diazido-4-sulfonic acid ester, 2,3,4,2'-tetrahydroxy-4'-methyl benzophenone-1,2-naphthoquinone diazido-5-sulfonic acid ester, 2,3,4,4'-tetrahydroxy-3'-methoxy benzophenone-1,2-naphthoquinone diazido-4-sulfonic acid ester, and 2,3,4,4'-tetrahydroxy-3'-methoxy benzophenone-1,2-naphthoquinone diazido-5-sulfonic acid ester; 1,2-naphthoquinone diazidosulfonic acid esters of (polyhydroxyphenyl)alkane such as tri(p-hydroxyphenyl)methane-1,2-naphthoquinone diazido-5-sulfonic acid ester, 1,1,1-tri(p-hydroxyphenyl)ethane-1,2-naphthoquinone diazido-4-sulfonic acid ester, 1,1,1-tri(p-hydroxyphenyl)ethane-1,2-naphthoquinone diazido-5-sulfonic acid ester, bis(2,3,4-trihydroxyphenyl)methane-1,2-naphthoquinone diazido-4-sulfonic acid ester, bis(2,3,4-trihydroxyphenyl)methane-1,2-naphthoquinone diazido-5-sulfonic acid ester, 2,2-bis(2,3,4-trihydroxyphenyl)propane-1,2-naphthoquinone diazido-4-sulfonic acid ester, 2,2-bis(2,3,4-trihydroxyphenyl)propane-1,2-naphthoquinone diazido-5-sulfonic acid ester, 1,1,3-tris (2,5-dimethyl-4-hydroxyphenyl)-3-phenylpropane-1,2-naphthoquinone diazido-4-sulfonic acid ester, 1,1,3-tris(2,5-dimethyl-4-hydroxyphenyl)-3-phenylpropane-1,2-naphthoquinone diazido-5-sulfonic acid ester, 4,4'-[1-[4-[1-[4-hydroxyphenyl]-1-methylethyl]phenyl]ethylidene] bisphenol-1,2-naphthoquinone diazido-4-sulfonic acid ester, 4,4'-[1-[4-[1-[4-hydroxyphenyl]-1-methylethyl]phenyl]ethylidene]bisphenol-1,2-naphthoquinone diazido-5-sulfonic acid ester, bis(2,5-dimethyl-4-hydroxyphenyl)-2-hydroxy phenylmethane-1,2-naphthoquinone diazido-4-sulfonic acid ester, bis(2,5-dimethyl-4-hydroxyphenyl)-2-hydroxy phenylmethane-1,2-naphthoquinone diazido-5-sulfonic acid ester, 3,3,3',3'-tetramethyl-1,1'-spiroindene-5,6,7,5',6',7'- hexanol-1,2-naphthoquinone diazido-4-sulfonic acid ester, 3,3,3',3'-tetramethyl-1,1'-spiroindene-5,6,7,5',6',7'-hexanol-1,2-naphthoquinone diazido-5-sulfonic acid ester, 2,2,4-trimethyl-7,2',4'-trihydroxyflavan-1,2-naphthoquinone diazido-4-sulfonic acid ester, and 2,2,4-trimethyl-7,2',4'-trihydroxyflavan-1,2-naphthoquinone diazido-5-sulfonic acid ester may be exemplified. These 1,2-quinonediazido compounds may be used alone or in a combination of two or more.

When the resin composition of this embodiment is prepared as a positive-type radiation-sensitive resin composition, the amount of the radiation-sensitive acid generator [E] used is preferably 5 parts by mass to 100 parts by mass based on 100 parts by mass of the copolymer [A], more preferably 10 parts by mass to 50 parts by mass. In this case, when the amount of the radiation-sensitive acid generator [E] used is below 5 parts by mass, the amount of acid generated by irradiation of radiation is less, therefore, the difference of solubility to a developer of an alkaline aqueous solution is likely to be less between irradiated and non-irradiated portions and patterning may be possibly difficult. Furthermore, since the amount of acid responsible for reaction of epoxy group is less, sufficient heat resistance and solvent resistance may be not attained. On the other hand, in cases of above 100 parts by mass and irradiation of radiation for a short period, the development may be difficult since excess unreacted radiation-sensitive acid generator [E] remains.

The resin composition of this embodiment may also contain ingredients (additives) other than described above as required within a reasonable range. The additive may be exemplified by a surfactant for improving a coating property and an adhesive aid for improving adhesion with substrates.

Fluorine-containing surfactants and silicone surfactants may be favorably used as the surfactant. Compounds, having a fluoroalkyl or fluoroalkylene group at any site of ends, main chains or side chains, may be used as the fluorine-containing surfactant; specific examples thereof are 1,1,2,2,2-tetrafluoro octyl(1,1,2,2-tetrafluoro propyl)ether, 1,1,2,2-tetrafluoro octylhexyl ether, octaethylene glycol di(1,1,2,2-tetrafluoro butyl)ether, hexaethylene glycol(1,1,2,2,3,3-hexafluoro pentyl)ether, octapropylene glycol di(1,1,2,2-tetrafluoro butyl) ether, hexapropylene glycol di(1,1,2,2,3,3-hexafluoro pentyl) ether, sodium perfluorododecylsulfonate, 1,1,2,2,8,8,9,9,10,10-decafluorododecane, 1,1,2,2,3,3-hexafluorodecane, sodium fluoroalkylbenzene sulfonate, sodium fluoroalkyl phosphonate, sodium fluoroalkyl carboxylate, fluoroalkyl polyoxyethylene ether, diglycerin tetrakis(fluoroalkylpolyoxyethylene ether), fluoroalkyl ammonium iodido, fluoroalkylbetaine, fluoroalkylpolyoxyethylene ether, perfluoroalkylpolyoxy ethanol, perfluoroalkyl alkoxylate, fluorine-containing alkyl ester, etc.

The marketed products of the fluorine-containing surfactant may be exemplified by BM-1000, BM-1100 (manufactured by BM CHEMIE Co.), Megafac F142D, F172, F173, F183, F178, F191, F471 (manufactured by DIC Co.), Fluorad FC 170C, FC-171, FC-430, FC-431 (manufactured by Sumitomo 3M Ltd.).

The marketed products of the silicone surfactant may be exemplified by Toray Silicone DC3PA, DC7PA, SH11PA, SH21PA, SH28PA, SH29PA, SH30PA, SH-190, SH-193, SZ-6032, SF-8428, DC-57, DC-190 (manufactured by Toray Silicone Co., Ltd.), TSF-4440, TSF-4300, TSF-4445, TSF-4446, TSF-4460, TSF-4452 (manufactured by GE Toshiba Silicone Ltd.).

The surfactant is preferably used in an amount of 5 parts by mass or less based on 100 parts by mass of the copolymer [A], more preferably 2 parts by mass or less. When the amount of the surfactant is above 5 parts by mass, the film is likely to be rough during coating.

Functional silane coupling agents are preferably used as the adhesive aid and the silane coupling agents are exemplified by those having a reactive substituent such as carboxyl, methacryloyl, isocyanate and epoxy groups; specific examples thereof include trimethoxysilyl benzoate, γ-methacryloxypropyl trimethoxysilane, vinyl triacetoxy silane, vinyl trimethoxy silane, γ-isocyanate propyl triethoxy silane, γ-glycidoxy propyl trimethoxy silane, β-(3,4-epoxycyclohexyl)ethyl trimethoxy silane, etc.

The adhesive aid is preferably used in an amount of 20 parts by mass or less based on 100 parts by mass of the copolymer [A], more preferably 10 parts by mass or less. When the amount of the adhesive aid is above 20 parts by mass, residuals tend to remain after development.

The resin composition of this embodiment may be prepared by mixing and solving uniformly the ingredients.

4. Spacer for Display Panel

The spacer for display panel of this embodiment is exemplified by spacers for keeping constant a gap (cell gap) between two substrates of liquid crystal display panels and dot spacers used for touch panels.

The spacer for display panel of this embodiment is formed from the resin composition of this embodiment. Particularly, it is favorably formed from the negative-type radiation-sensitive resin composition containing the polymerizable compound [C] and the radiation-sensitive polymerization initiator [D] in addition to the copolymer [A] and the organic solvent [B] or from the positive-type radiation-sensitive resin composition containing the radiation-sensitive acid generator [E] in addition to the copolymer [A] and the organic solvent [B]. The process for forming the spacer for display panel using the negative-type radiation-sensitive resin composition of the present invention is explained below.

A coating film is formed by coating the negative-type radiation-sensitive resin composition on a surface of substrate and removing the solvent by heating. Various processes such as spray, roll coat, rotary coating and slit die coater processes may be employed as the coating process of the resin composition on the surface of substrate. Then the coating film is heated (prebaked). The solvent is evaporated by heating and a non-flowable coating film is obtained. The heating condition may be appropriately selected depending on species of the ingredients, compounding ratios, etc. The condition of 70° C.° to 90° C. for about 1 to 5 minutes is typically selected.

Then the heated coating film is polymerized by exposing through a mask with a predetermined pattern, followed by developing with a developer and removing unnecessary portions. The radiation used for the exposure can be appropriately selected from visible light, UV rays, far-UV radiation, charged particle radiation, X rays, etc.; the radiation with a wavelength in the range of 190 nm to 450 nm is preferable. As for the developer, alkaline aqueous solution of alkali, for example, of inorganic alkalis such as sodium hydroxide, potassium hydroxide, sodium carbonate, sodium silicate, sodium metasilicate and aqueous ammonia; primary amines such as ethylamine and n-propylamine; secondary amines such as diethylamine and di-n-propylamine; tertiary amines such as triethylamine, methyl diethylamine and N-methylpyrolidone; alcohol amines such as diethyl ethanolamine and triethanolamine; quaternary ammonium salts such as tetramethyl ammonium hydroxide, tetraethyl ammonium hydroxide and choline; cyclic amines such as pyrrole, piperidine, 1,8-diazabicyclo[5.4.0]-7-undecene and 1,5-diazabicyclo[4.3.0]-5-nonane can be used. Furthermore, aqueous solutions, prepared by adding an appropriated amount of water-soluble organic solvents such as methanol and ethanol or surfactants to the alkaline aqueous solutions described above, can be used as a developer.

The development time is typically 30 seconds to 180 seconds. The development process may be any of paddle, dipping, shower and spray processes, etc. After development, a patterned film is formed by rinsing for 30 seconds to 90 seconds with flowing water and wind-drying with compressed air or nitrogen. Subsequently, a spacer having a predetermined pattern is formed by heat-treating using a heating device such as hot plates and ovens at a predetermined temperature (e.g. 150° C. to 250° C.) for a predetermined time (e.g. 5 to 30 minutes on hot plates, 30 to 90 minutes in ovens).

5. Planarization Film

The planarization film of this embodiment may be exemplified by TFT element planarization films of transparent insulative films formed between TFTs and transparent electrodes of liquid crystal display panels.

The planarization film of this embodiment is formed from the resin composition of this embodiment. Particularly, it is favorably formed from the positive-type radiation-sensitive resin composition containing the radiation-sensitive acid generator [E] in addition to the copolymer [A] and the organic solvent [B]. The process for forming the planarization film using the positive-type radiation-sensitive resin composition of the present invention is explained below.

The planarization film is formed by coating the positive-type radiation-sensitive resin composition on a substrate to form a coating film, exposing the coating film to radiation through a pattern mask, developing the exposed coating film, and heat-treating the developed coating film. The process to form the coating film on the substrate and exposing and developing processes can be carried out similarly as the processes to form the spacer for display panel described above. Here, when negative-type radiation-sensitive resin compositions are used, exposed portions remain and masked non-exposed portions are removed by development; however, when positive-type radiation-sensitive resin compositions are used, it is different in that masked portions remain and non-masked exposed portions are removed by development conversely.

After development, a patterned coating film is formed through water-rinsing and wind-drying. It is preferred that the radiation-sensitive acid generator [E] remaining in the coating film is decomposed before heat-treating the coating film by post-exposing with radiation. Then the coating film is heat-treated by a heating device such as hot plates and ovens, thereby an intended planarization film is formed. Here, the heating conditions are similar as those of the process for forming the spacer for display panel described above.

6. Thermosetting Protective Film

The thermosetting protective film of this embodiment may be exemplified by protective films to prevent damage or degradation of color filters and also to coat steps between pixels of color layers in liquid crystal display panels.

The thermosetting protective film of this embodiment is formed from the resin composition of this embodiment.

When the protective film is formed using a resin composition consisting of the copolymer [A] and the organic solvent [B] (and additives such as surfactant and adhesive aid, as required), a coating film is formed by coating the resin composition on a surface of a substrate and removing the solvent by heating. Various processes such as spray, roll coat, rotary coating and slit die coater processes may be employed as the coating process of the resin composition on the surface of the substrate. Subsequently, an intended thermosetting protective film is formed by heat-treating the resulting coating film using a heating device such as hot plates and ovens at a predetermined temperature (e.g. 150° C. to 250° C.) for a predetermined time (e.g. 5 to 30 minutes on hot plates, 30 to 90 minutes in ovens).

The protective film may also be formed using the negative-type radiation-sensitive resin composition or the positive-type radiation-sensitive resin composition described above. In this case, the steps of removing the solvent by prebaking after forming the coating film on a substrate, exposing by irradiating radiation, and removing unnecessary portions by developing are added. The processes of exposing and developing, etc. can be carried out similarly as the processes to form the spacer for display panel described above.

Moreover, microlenses can be formed using the resin composition, the negative-type radiation-sensitive resin compositions or the positive-type radiation-sensitive resin compositions described above. In this case, a coating film is formed on a substrate, followed by removing the solvent by prebaking, exposing by irradiating with radiation, and removing unnecessary portions by developing, thereby to form a pattern corresponding to a lens. Then a microlens can be formed by a process of heating the pattern to cause melt-flow and utilize directly it as a lens, a process in which a lens-shape is transferred onto a base material by dry-etching using the melt-flowed lens pattern as a mask, or the like.

EXAMPLES

Examples of the present invention are explained hereinafter; however, the present invention should not be limited to the examples.

Preparation of Reaction Mixture (a1)

Preparation Example 1

To a flask equipped with a condenser and a stirrer, 20 parts by mass (0.23 mol) of methacrylic acid and 31.1 parts by mass (0.345 mol) of 1,2-dimethoxyethane were introduced, and the mixture was maintained at 80° C. for 4 hours while stirring, thereby obtaining a methacrylic acid/1,2-dimethoxyethane reaction mixture [MA-1]. The mol ratio of methacrylic acid/1,2-dimethoxyethane was 1/1.5. The infrared absorption spectrum (IR spectrum) of the resulting [MA-1] was measured using a Fourier transform IR spectrometer (manufactured by Thermo Electron Co., Nicolet 4700) by an ATR (total reflection) process. The resulting spectrum is shown in FIG. 1. As clearly seen from FIG. 1, a new absorption (1720 cm$^{-1}$) attributable to the reaction product was detected.

Preparation Example 2

To a flask equipped with a condenser and a stirrer, 20 parts by mass (0.23 mol) of methacrylic acid and 37.0 parts by mass (0.276 mol) of diethylene glycol dimethyl ether were introduced, and the mixture was maintained at 90° C. for 2 hours while stirring, thereby obtaining a methacrylic acid/diethylene glycol dimethyl ether reaction mixture [MA-2]. The mol ratio of methacrylic acid/diethylene glycol dimethyl ether was 1/1.2. In the IR spectrum of the resulting [MA-2], a new absorption (1717 cm$^{-1}$) attributable to the reaction product was detected.

Preparation Example 3

To a flask equipped with a condenser and a stirrer, 20 parts by mass (0.23 mol) of methacrylic acid and 36.4 parts by mass (0.276 mol) of 2,5-dimethoxytetrahydrofuran were introduced, and the mixture was maintained at 90° C. for 2 hours while stirring, thereby obtaining a methacrylic acid/2,5-dimethoxytetrahydrofuran reaction mixture [MA-3]. The mol ratio of methacrylic acid/2,5-dimethoxytetrahydrofuran was 1/1.2. In the IR spectrum of the resulting [MA-3], a new absorption (1721 cm$^{-1}$) attributable to the reaction product was detected.

Preparation Example 4

To a flask equipped with a condenser and a stirrer, 20 parts by mass (0.23 mol) of methacrylic acid and 28.7 parts by mass (0.276 mol) of diethoxymethane were introduced, and the mixture was maintained at 80° C. for 4 hours while stirring, thereby obtaining a methacrylic acid/diethoxymethane reaction mixture [MA-4]. The mol ratio of methacrylic acid/diethoxymethane was 1/1.2. In the infrared absorption spectrum (IR spectrum) of the resulting [MA-4], a new absorption (1721 cm$^{-1}$) attributable to the reaction product was detected.

Preparation Example 5

To a flask equipped with a condenser and a stirrer, 20 parts by mass (0.23 mol) of methacrylic acid and 28.7 parts by mass (0.276 mol) of 2,2-diethoxymethane were introduced, and the mixture was maintained at 80° C. for 4 hours while stirring, thereby obtaining a methacrylic acid/2,2-diethoxymethane reaction mixture [MA-5]. In the IR spectrum of the resulting [MA-5], a new absorption (1719 cm$^{-1}$) attributable to the reaction product was detected.

Preparation Example 6

Figure 2:
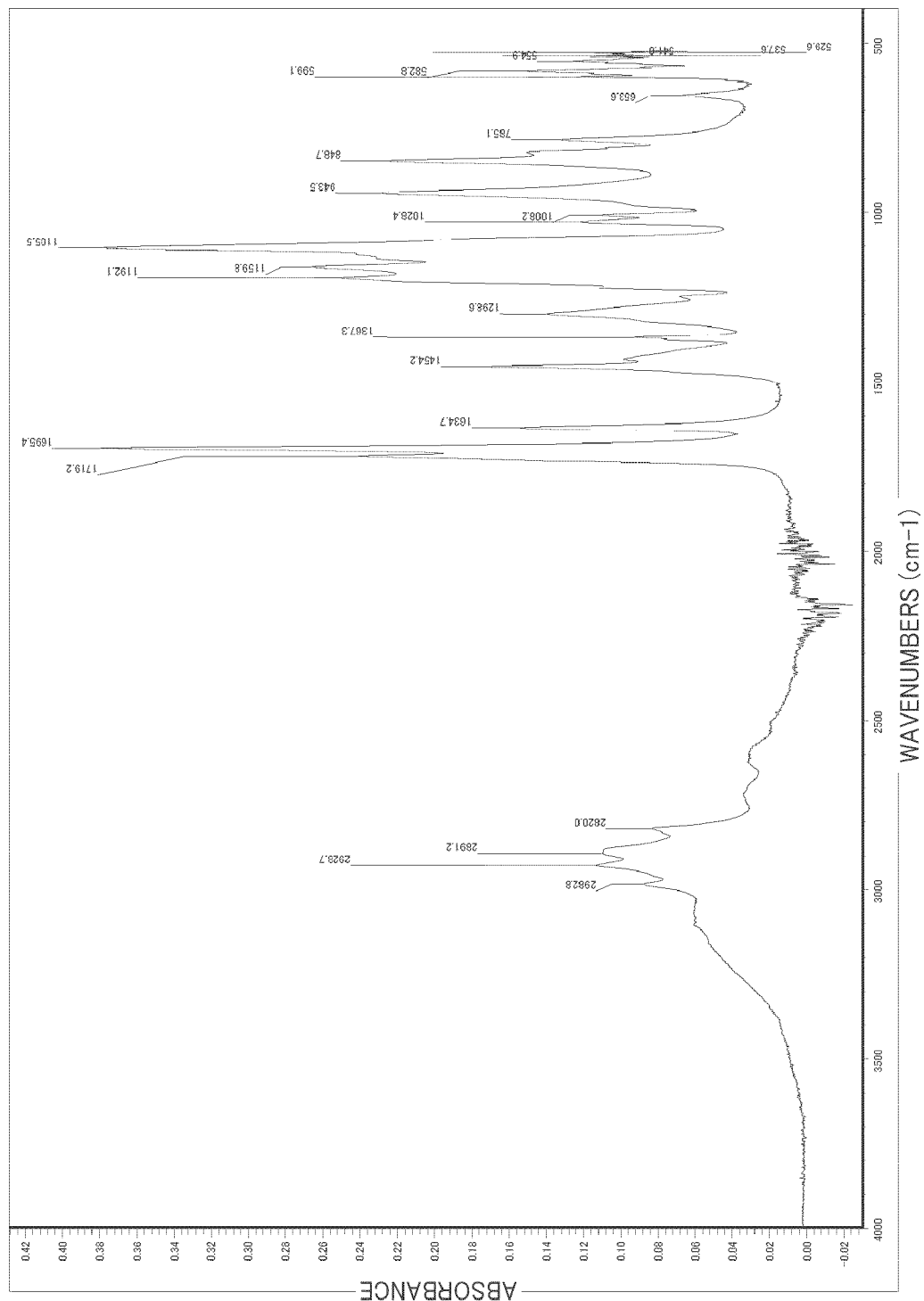
FIG. 2 is an infrared absorption spectrum (IR spectrum) of a reaction mixture (MA-6) of Preparation Example 6 of the embodiment.

To a flask equipped with a condenser and a stirrer, 20 parts by mass (0.23 mol) of methacrylic acid and 20.7 parts by mass (0.23 mol) of 1,2-dimethoxyethane were introduced, and the mixture was maintained at 80° C. for 4 hours while stirring, thereby obtaining a methacrylic acid/1,2-dimethoxyethane reaction mixture [MA-6]. The mol ratio of methacrylic acid/1,2-dimethoxyethane was 1/1. The infrared absorption spectrum (IR spectrum) of the resulting [MA-6] was measured by a procedure similar to that of Preparation Example 1. The resulting spectrum is shown in FIG. 2. As clearly seen from FIG. 2, a new absorption (1719 cm$^{-1}$) attributable to the reaction product was detected.

Synthesis of Copolymer [A]

Synthesis Example 1

To a flask equipped with a condenser and a stirrer, 4 parts by mass of 2,2'-azobisisobutyronitrile and 188.9 parts by mass of diethylene glycol dimethyl ether were introduced, subsequently 51.1 parts by mass of [MA-1] (corresponding to 20 parts by mass of methacrylic acid) as an ingredient (a1) and 80 parts by mass of glycidyl methacrylate as an ingredient (a2) were introduced, and replacement by nitrogen gas was carried out, then mild stirring was initiated. The temperature of the solution was raised to 80° C., and the temperature was maintained for 3 hours, thereby obtaining a polymer solution containing the copolymer [A-1]. The solid content concentration of the polymer solution was 31.3%.

Synthesis Example 2

To a flask equipped with a condenser and a stirrer, 8 parts by mass of 2,2'-azobis-(2,4-dimethylvaleronitrile) and 188.9 parts by mass of methyl 3-methoxypropionate were introduced, subsequently 51.1 parts by mass of [MA-1] (corresponding to 20 parts by mass of methacrylic acid) as an ingredient (a1), 80 parts by mass of glycidyl methacrylate as an ingredient (a2), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-2]. The solid content concentration of the polymer solution was 31.3%. By the way, GPC of the polymer solution was measured and the result was Mw=15600. The GPC measurement was carried out using Shodex SYSTEM21 (manufactured by Showa Denko K.K.). In addition, the column in the measurement was Shodex KF-805×803× 802 and the detector was Shodex RI-71S. In the measurement, the measuring temperature was 40° C. and the eluting solution was THF.

Synthesis Example 3

To a flask equipped with a condenser and a stirrer, 8 parts by mass of 2,2'-azobis-(2,4-dimethylvaleronitrile) and 183.0 parts by mass of methyl 3-methoxypropionate were introduced, subsequently 57.0 parts by mass of [MA-2] (corresponding to 20 parts by mass of methacrylic acid) as an ingredient (a1), 80 parts by mass of glycidyl methacrylate as an ingredient (a2), and 2.0 parts by mass of α-methylstyrene dimer as a molecular weight adjusting agent were introduced, and replacement by nitrogen gas was carried out, then mild stirring was initiated. The temperature of the solution was raised to 70° C., and the temperature was maintained for 5 hours, thereby obtaining a polymer solution containing the copolymer [A-3]. The solid content concentration of the polymer solution was 31.3%.

Synthesis Example 4

To a flask equipped with a condenser and a stirrer, 8 parts by mass of 2,2'-azobis-(2,4-dimethylvaleronitrile) and 183.6 parts by mass of methyl 3-methoxypropionate were introduced, subsequently 56.4 parts by mass of [MA-3] (corresponding to 20 parts by mass of methacrylic acid) as an ingredient (a1) and 80 parts by mass of glycidyl methacrylate as an ingredient (a2) were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-4]. The solid content concentration of the polymer solution was 31.0%.

Synthesis Example 5

To a flask equipped with a condenser and a stirrer, 8 parts by mass of 2,2'-azobis-(2,4-dimethylvaleronitrile) and 191.3 parts by mass of methyl 3-methoxypropionate were introduced, subsequently 48.7 parts by mass of [MA-4] (corresponding to 20 parts by mass of methacrylic acid) as an ingredient (a1), 75 parts by mass of glycidyl methacrylate as an ingredient (a2), 5 parts by mass of styrene as an ingredient (a3), and 2.0 parts by mass of α-methylstyrene dimer as a molecular weight adjusting agent were introduced, and replacement by nitrogen gas was carried out, then mild stirring was initiated. The temperature of the solution was raised to 70° C., and the temperature was maintained for 5 hours, thereby obtaining a polymer solution containing the copolymer [A-5]. The solid content concentration of the polymer solution was 31.1%.

Synthesis Example 6

To a flask equipped with a condenser and a stirrer, 8 parts by mass of 2,2'-azobis-(2,4-dimethylvaleronitrile) and 183.6 parts by mass of propylene glycol monomethyl ether acetate were introduced, subsequently 56.4 parts by mass of [MA-3] (corresponding to 20 parts by mass of methacrylic acid) as an ingredient (a1), 75 parts by mass of glycidyl methacrylate as an ingredient (a2), 5 parts by mass of isoprene as an ingredient (a3), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-6]. The solid content concentration of the polymer solution was 31.3%.

Synthesis Example 7

To a flask equipped with a condenser and a stirrer, 8 parts by mass of 2,2'-azobis-(2,4-dimethylvaleronitrile) and 191.3 parts by mass of propylene glycol monomethyl ether acetate were introduced, subsequently 48.7 parts by mass of [MA-5] (corresponding to 20 parts by mass of methacrylic acid) as an ingredient (a1), 75 parts by mass of glycidyl methacrylate as an ingredient (a2), 5 parts by mass of butyl methacrylate as an ingredient (a3), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-7]. The solid content concentration of the polymer solution was 31.2%.

Synthesis Example 8

To a flask equipped with a condenser and a stirrer, 8 parts by mass of 2,2'-azobis-(2,4-dimethylvaleronitrile), 73.4 parts by mass of methyl 3-methoxypropionate, and 110.2 parts by mass of ethyl 3-ethoxypropionate were introduced, subsequently 56.4 parts by mass of [MA-3] (corresponding to 20 parts by mass of methacrylic acid) as an ingredient (a1), 70 parts by mass of glycidyl methacrylate as an ingredient (a2), 10 parts by mass of butyl methacrylate as an ingredient (a3), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-8]. The solid content concentration of the polymer solution was 31.3%.

Synthesis Example 9

To a flask equipped with a condenser and a stirrer, 8 parts by mass of 2,2'-azobis-(2,4-dimethylvaleronitrile) and 191.3 parts by mass of ethyl 3-ethoxypropionate were introduced, subsequently 48.7 parts by mass of [MA-4] (corresponding to 20 parts by mass of methacrylic acid) as an ingredient (a1), 60 parts by mass of glycidyl methacrylate as an ingredient (a2), 20 parts by mass of cyclohexyl methacrylate as an ingredient (a3), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 5 hours, thereby obtaining a polymer solution containing the copolymer [A-9]. The solid content concentration of the polymer solution was 31.1%.

Synthesis Example 10

To a flask equipped with a condenser and a stirrer, 8 parts by mass of 2,2'-azobis-(2,4-dimethylvaleronitrile) and 169.3 parts by mass of methyl 3-methoxypropionate were introduced, subsequently 40.7 parts by mass of [MA-6] (corresponding to 20 parts by mass of methacrylic acid) as an ingredient (a1), 70 parts by mass of glycidyl methacrylate as an ingredient (a2), 10 parts by mass of tricyclo[5.2.1.0$^{2,6}$] deca-8-yl methacrylate as an ingredient (a3), and 2.0 parts by mass of α-methylstyrene dimer as a molecular weight adjusting agent were introduced, and replacement by nitrogen gas was carried out, then a mild stirring was initiated. The temperature of the solution was raised to 70° C., and the temperature was maintained for 3 hours, thereby obtaining a polymer solution containing the copolymer [A-10]. The solid content concentration of the polymer solution was 34.5%.

Comparative Synthesis Example 1

To a flask equipped with a condenser and a stirrer, 4 parts by mass of 2,2'-azobisisobutyronitrile and 220 parts by mass of diethylene glycol dimethyl ether were introduced, subsequently 20 parts by mass of methacrylic acid and 80 parts by mass of glycidyl methacrylate were introduced, and replacement by nitrogen gas was carried out, then mild stirring was initiated. The temperature of the solution was raised to 80° C. and the temperature was maintained for 3 hours, then the polymerizing solution was gelatinized and a polymer solution containing a copolymer could not be obtained.

Comparative Synthesis Example 2

To a flask equipped with a condenser and a stirrer, 8 parts by mass of 2,2'-azobis-(2,4-dimethylvaleronitrile) and 220 parts by mass of methyl 3-methoxypropionate were introduced, subsequently 20 parts by mass of methacrylic acid, 80 parts by mass of glycidyl methacrylate, and 2.0 parts by mass of α-methylstyrene dimer were introduced, and replacement by nitrogen gas was carried out, then mild stirring was initiated. The temperature of the solution was raised to 70° C. and the temperature was maintained for 5 hours to obtain a polymer solution containing a copolymer [A-2R]. The solid content concentration of the polymer solution was 31.4%. In addition, GPC of the polymer solution was measured and the result was Mw=27800. The molecular weight of the polymer had increased to higher than that of the corresponding Synthesis Example 2. Furthermore, the viscosity of the polymer solution had increased so that the viscosity could not be measured by a rotatory viscometer.

Comparative Synthesis Example 3

To a flask equipped with a condenser and a stirrer, 8 parts by mass of 2,2'-azobis-(2,4-dimethylvaleronitrile) and 220 parts by mass of propylene glycol monomethyl ether acetate were introduced, subsequently 20 parts by mass of methacrylic acid, 75 parts by mass of glycidyl methacrylate, 5 parts by mass of isoprene, and 2.0 parts by mass of α-methylstyrene dimer as a molecular weight adjusting agent were introduced, and replacement by nitrogen gas was carried out, then mild stirring was initiated. The temperature of the solution was raised to 70° C. and the temperature was maintained for 5 hours to obtain a polymer solution containing a copolymer [A-3R]. The solid content concentration of the polymer solution was 31.3%.

Comparative Synthesis Example 4

To a flask equipped with a condenser and a stirrer, 8 parts by mass of 2,2'-azobis-(2,4-dimethylvaleronitrile), 88 parts by mass of methyl 3-methoxypropionate, and 132 parts by mass of ethyl 3-ethoxypropionate were introduced, subsequently 20 parts by mass of methacrylic acid, 70 parts by mass of glycidyl methacrylate, and 10 parts by mass of butyl methacrylate were introduced, and replacement by nitrogen gas was carried out, then mild stirring was initiated. The temperature of the solution was raised to 70° C. and the temperature was maintained for 4 hours, then the polymerizing solution was gelatinized and a polymer solution containing a copolymer could not be obtained.

Comparative Synthesis Example 5

To a flask equipped with a condenser and a stirrer, 8 parts by mass of 2,2'-azobis-(2,4-dimethylvaleronitrile) and 220 parts by mass of ethyl 3-ethoxypropionate were introduced, subsequently 20 parts by mass of methacrylic acid, 60 parts by mass of glycidyl methacrylate, 20 parts by mass of cyclohexyl methacrylate, and 2.0 parts by mass of α-methylstyrene dimer as a molecular weight adjusting agent were introduced, and replacement by nitrogen gas was carried out, then a mild stirring was initiated. The temperature of the solution was raised to 70° C. and the temperature was maintained for 4 hours, then the polymerizing solution was gelatinized and a polymer solution containing a copolymer could not be obtained.

Preparation of Negative-Type Radiation-Sensitive Resin Composition and Formation and Evaluation of Spacer Pattern Example 1

(1) Preparation of Negative-type Radiation-Sensitive Resin Composition

A polymer solution containing the copolymer [A-1] obtained in Synthesis Example 1 (corresponding to 100 parts by mass (solid content) of copolymer [A-1]), 100 parts by mass of dipentaerythritol hexaacrylate (A-DPH, manufactured by Shin-Nakamura Chemical Co. Ltd.) as an ingredient [C], and 25 parts by mass of 2-benzyl-2-dimethylamino-1-(4-morpholino phenyl)-butane-1-one (IRGACURE 369, manufactured by Ciba Specialty Chemicals Inc.) as an ingredient [D] were mixed, and the mixture was dissolved in diethylene glycol dimethyl ether so that the solid content concentration was 35% by mass, then the solution was filtered through a PTFE (polytetrafluoroethylene) filter with pore size 0.5 μm to prepare a negative-type radiation-sensitive resin composition [N-1].

(2) Formation of Spacer Pattern

The negative-type radiation-sensitive resin composition [N-1] was coated on a glass substrate for 10 seconds at a rotation number of 900 rpm using a spinner and prebaked at 80° C. for 3 minutes on a hot plate to form a coating film. The resulting coating film was irradiated for 30 seconds with UV-ray of intensity 10 mW/cm$^2$ at 365 nm through a mask of 16 μm corner remaining pattern. In this case, the UV-ray irradiation was carried out under an oxygen atmosphere (in air). Then it was developed at 25° C. for 60 seconds using a 0.5% by mass aqueous solution of tetramethyl ammonium hydroxide, followed by rinsing for 1 minute with flowing purified water. The resulting spacer pattern was heated and cured at 220° C. for 60 minutes in an oven. The film thickness of the spacer at this stage is shown in Table 1.

(3) Evaluation of Resolution

In the spacer patterns obtained in (2) described above, the case of resolvable patter is expressed as "A" (good) and the case of non-resolvable patter is expressed as "B" (no-good). The results are shown in Table 1.

(4) Evaluation of Dimensional Heat Resistance

Spacer patterns obtained in (2) described above were heated at 250° C. for 60 minutes in an oven. Dimensional change rates of film thickness are shown in Table 1. When the dimensional change rate of before and after heating is within ±5%, the dimensional heat resistance can be evaluated to be good.

(5) Evaluation of Adhesion

Adhesion of the patterned thin films obtained in (2) described above was evaluated by a pressure cooker test (120° C., humidity 100%, tape peeling test after 4 hours). The evaluation result was expressed by a number of remaining patterns per 100 patterns. The results are shown in Table 1.

(6) Evaluation of Storage Stability

The negative-type radiation-sensitive resin composition N-1 was heated in an oven of 40° C. for one week, and storage stability was evaluated based on viscosity change of before and after heating. The case of viscosity increase rate of 10% or less is evaluated as "A" (good) and the case of above 10% was evaluated as "B" (no-good). The results are shown in Table 1.

Example 2

A negative-type radiation-sensitive resin composition [N-2] was prepared in the same manner as Example 1 except that the polymer solution containing the copolymer [A-2] obtained in Synthesis Example 2 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a spacer pattern which was evaluated. The results are shown in Table 1.

Example 3

A negative-type radiation-sensitive resin composition [N-3] was prepared in the same manner as Example 1 except that the polymer solution containing the copolymer [A-3] obtained in Synthesis Example 3 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a spacer pattern which was evaluated. The results are shown in Table 1.

Example 4

A negative-type radiation-sensitive resin composition [N-4] was prepared in the same manner as Example 1 except that the polymer solution containing the copolymer [A-4] obtained in Synthesis Example 4 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a spacer pattern which was evaluated. The results are shown in Table 1.

Example 5

A negative-type radiation-sensitive resin composition [N-5] was prepared in the same manner as Example 1 except that the polymer solution containing the copolymer [A-5] obtained in Synthesis Example 5 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a spacer pattern which was evaluated. The results are shown in Table 1.

Example 6

A negative-type radiation-sensitive resin composition [N-6] was prepared in the same manner as Example 1 except that the polymer solution containing the copolymer [A-6] obtained in Synthesis Example 6 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a spacer pattern which was evaluated. The results are shown in Table 1.

Example 7

A negative-type radiation-sensitive resin composition [N-7] was prepared in the same manner as Example 1 except that the polymer solution containing the copolymer [A-7] obtained in Synthesis Example 7 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a spacer pattern which was evaluated. The results are shown in Table 1.

Example 8

A negative-type radiation-sensitive resin composition [N-8] was prepared in the same manner as Example 1 except that the polymer solution containing the copolymer [A-8] obtained in Synthesis Example 8 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a spacer pattern which was evaluated. The results are shown in Table 1.

Example 9

A negative-type radiation-sensitive resin composition [N-9] was prepared in the same manner as Example 1 except that the polymer solution containing the copolymer [A-9] obtained in Synthesis Example 9 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a spacer pattern which was evaluated. The results are shown in Table 1.

Example 10

A negative-type radiation-sensitive resin composition [N-10] was prepared in the same manner as Example 1 except that the polymer solution containing the copolymer [A-10] obtained in Synthesis Example 10 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a spacer pattern which was evaluated. The results are shown in Table 1.

Comparative Example 1

A negative-type radiation-sensitive resin composition [N-2R] was prepared in the same manner as Example 2 except that the polymer solution containing the copolymer [A-2R] obtained in Comparative Synthesis Example 2 was used in place of the polymer solution containing the copolymer [A-2] obtained in Synthesis Example 2, and was then used to form a spacer pattern which was evaluated. The results are shown in Table 1.

Comparative Example 2

A negative-type radiation-sensitive resin composition [N-3R] was prepared in the same manner as Example 6 except that the polymer solution containing the copolymer [A-3R] obtained in Comparative Synthesis Example 3 was used in place of the polymer solution containing the copolymer [A-6] obtained in Synthesis Example 6, and was then used to form a spacer pattern which was evaluated. The results are shown in Table 1.

TABLE 1

| | Film Thickness (μm) | Resolution | Dimensional Heat Resistance | Adhesion | Storage Stability |
|---|---|---|---|---|---|
| Example 1 | 7.5 | A | −3.0% | 100 | A |
| Example 2 | 7.5 | A | −3.0% | 100 | A |
| Example 3 | 7.5 | A | −3.0% | 100 | A |
| Example 4 | 7.5 | A | −3.0% | 100 | A |
| Example 5 | 7.8 | A | −3.2% | 100 | A |
| Example 6 | 7.6 | A | −2.9% | 100 | A |
| Example 7 | 7.6 | A | −2.9% | 100 | A |
| Example 8 | 7.6 | A | −2.9% | 100 | A |
| Example 9 | 7.6 | A | −2.9% | 100 | A |
| Example 10 | 7.5 | A | −3.0% | 100 | A |

TABLE 1-continued

|  | Film Thickness (μm) | Resolution | Dimensional Heat Resistance | Adhesion | Storage Stability |
|---|---|---|---|---|---|
| Comparative Example 1 | 7.7 | B | −3.0% | 100 | B |
| Comparative Example 2 | 7.7 | B | −3.0% | 100 | B |

Preparation of Positive-type Radiation-Sensitive Resin Composition and Formation and Evaluation of Patterned Thin Film Example 11

(1) Preparation of Positive-type Radiation-Sensitive Resin Composition

A polymer solution containing the copolymer [A-1] obtained in Synthesis Example 1 (corresponding to 100 parts by mass (solid content) of copolymer [A-1]), 30 parts by mass of a condensed product (4,4'-[1-[4-[1v-hydroxyphenyl]-1-methylethyl]phenyl]ethylidene]bisphenol-1,2-naphthoquinone diazido-5-sulfonic acid ester) between 4,4'-[1-[4-[1-[4-hydroxyphenyl]-1-methylethyl]phenyl]ethylidene] bisphenol (1 mol) and 1,2-naphthoquinone diazido-5-sulfonyl chloride (2 moles) as an ingredient [E], and 5 parts by mass of 3-methacryloxypropyl trimethoxysilane as an adhesive aid were mixed, and the mixture was dissolved in diethylene glycol dimethyl ether so that the solid content concentration was 30% by mass, then the solution was filtered through a PTFE (polytetrafluoroethylene) filter with pore size 0.5 μm to prepare a positive-type radiation-sensitive resin composition [P-1].

(2) Formation of Patterned Thin Film

The positive-type radiation-sensitive resin composition P-1 was coated on a glass substrate using a spinner and then prebaked at 80° C. for 5 minutes on a hot plate to form a coating film. The resulting coating film was irradiated for 15 seconds with UV-ray of intensity 10 mW/cm$^2$ at 365 nm using a predetermined pattern mask. Then it was developed at 25° C. for 2 minutes using a 0.5% by mass aqueous solution of tetramethyl ammonium hydroxide, followed by rinsing for 1 minute with flowing purified water. Unnecessary portions were removed by these procedures. The resulting pattern was irradiated for 30 seconds with UV-ray of intensity 10 mW/cm$^2$ at 365 nm and then was heated and cured at 160° C. for 60 minutes in an oven to form a patterned thin film with film thickness 5 μm.

(3) Evaluation of Resolution

In the patterned thin film obtained in (2) described above, the case of resolvable void patter (hole of 5 μm by 5 μm) was evaluated as "A" (good) and the case of non-resolvable void patter was evaluated as "B" (no-good). The results are shown in Table 2.

(4) Evaluation of Storage Stability

The positive-type radiation-sensitive resin composition P-1 was heated in an oven of 40° C. for one week, and storage stability was evaluated based on viscosity change of before and after heating. The case of viscosity increase rate of 10% or less is evaluated as "A" (good) and the case of above 10% was evaluated as "B" (no-good). The results are shown in Table 2.

(5) Evaluation of Solvent Resistance

The glass substrate, on which the patterned thin film had been formed in (2) described above, was immersed into N-methylpyrrolidone at 50° C. for 10 minutes and change of the film thickness was evaluated. The case of swollen rate of 0% to 10% was evaluated as "A" (good), and the case of swollen rate of above 10% and the case of decreased film thickness due to dissolution were evaluated as "B" (no-good). The results are shown in Table 2.

Example 12

A positive-type radiation-sensitive resin composition [P-2] was prepared in the same manner as Example 11 except that the polymer solution containing the copolymer [A-2] obtained in Synthesis Example 2 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a patterned thin film which was evaluated. The results are shown in Table 2.

Example 13

A positive-type radiation-sensitive resin composition [P-3] was prepared in the same manner as Example 11 except that the polymer solution containing the copolymer [A-3] obtained in Synthesis Example 3 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a patterned thin film which was evaluated. The results are shown in Table 2.

Example 14

A positive-type radiation-sensitive resin composition [P-4] was prepared in the same manner as Example 11 except that the polymer solution containing the copolymer [A-4] obtained in Synthesis Example 4 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a patterned thin film which was evaluated. The results are shown in Table 2.

Example 15

A positive-type radiation-sensitive resin composition [P-5] was prepared in the same manner as Example 11 except that the polymer solution containing the copolymer [A-5] obtained in Synthesis Example 5 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a patterned thin film which was evaluated. The results are shown in Table 2.

Example 16

A positive-type radiation-sensitive resin composition [P-6] was prepared in the same manner as Example 11 except that the polymer solution containing the copolymer [A-6] obtained in Synthesis Example 6 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a patterned thin film which was evaluated. The results are shown in Table 2.

Example 17

A positive-type radiation-sensitive resin composition [P-7] was prepared in the same manner as Example 11 except that the polymer solution containing the copolymer [A-7] obtained in Synthesis Example 7 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a patterned thin film which was evaluated. The results are shown in Table 2.

Example 18

A positive-type radiation-sensitive resin composition [P-8] was prepared in the same manner as Example 11 except that the polymer solution containing the copolymer [A-8] obtained in Synthesis Example 8 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a patterned thin film which was evaluated. The results are shown in Table 2.

Example 19

A positive-type radiation-sensitive resin composition [P-9] was prepared in the same manner as Example 11 except that the polymer solution containing the copolymer [A-9] obtained in Synthesis Example 9 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a patterned thin film which was evaluated. The results are shown in Table 2.

Example 20

A positive-type radiation-sensitive resin composition [P-10] was prepared in the same manner as Example 11 except that the polymer solution containing the copolymer [A-10] obtained in Synthesis Example 10 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a patterned thin film which was evaluated. The results are shown in Table 2.

Comparative Example 3

A positive-type radiation-sensitive resin composition [P-2R] was prepared in the same manner as Example 12 except that the polymer solution containing the copolymer [A-2R] obtained in Comparative Synthesis Example 2 was used in place of the polymer solution containing the copolymer [A-2] obtained in Synthesis Example 2, and was then used to form a patterned thin film which was evaluated. The results are shown in Table 2.

Comparative Example 4

A positive-type radiation-sensitive resin composition [P-3R] was prepared in the same manner as Example 16 except that the polymer solution containing the copolymer [A-3R] obtained in Comparative Synthesis Example 3 was used in place of the polymer solution containing the copolymer [A-6] obtained in Synthesis Example 6, and was then used to form a patterned thin film which was evaluated. The results are shown in Table 2.

TABLE 2

|  | Resolution | Solvent Resistance | Storage Stability |
|---|---|---|---|
| Example 11 | A | 2% | A |
| Example 12 | A | 2% | A |
| Example 13 | A | 2% | A |
| Example 14 | A | 2% | A |
| Example 15 | A | 3% | A |
| Example 16 | A | 3% | A |
| Example 17 | A | 3% | A |
| Example 18 | A | 3% | A |
| Example 19 | A | 3% | A |
| Example 20 | A | 2% | A |
| Comparative Example 3 | B | 3% | B |
| Comparative Example 4 | B | 3% | B |

Preparation of Thermosetting Resin Composition and Formation and Evaluation of Thermoset Film

Example 21

(1) Preparation of Thermosetting Resin Composition

A polymer solution containing the copolymer [A-1] obtained in Synthesis Example 1 (corresponding to 100 parts by mass (solid content) of copolymer [A-1]) and 5 parts by mass of 3-glycidoxy propyl trimethoxy silane (KBM-403, manufactured by Shin-Etsu Silicone Co., Ltd.) as an adhesive aid were mixed, and the mixture was dissolved in diethylene glycol dimethyl ether so that the solid content concentration was 20% by mass, then the solution was filtered through a millipore filter with pore size 0.5 µm to prepare a thermosetting resin composition [H-1].

(2) Formation of Thermoset Film

The thermosetting resin composition H-1 was coated on a SiO$_2$ glass substrate using a spinner and then heat-treated under a condition of 180° C. for 30 minutes on a hot plate to form a coating film of film thickness 2.0 µm.

(3) Evaluation of Transparency

In order to evaluate transparency, the thermosetting resin composition H-1 was coated on an alkali-free glass substrate not on the SiO$_2$ glass substrate and then heat-treated at 180° C. for 30 minutes on a hot plate to form a coating film of film thickness 2.0 µm.

The transmittance of the glass substrate, on which the coating film had been formed, was measured using a spectrophotometer from 400 nm to 800 nm. The case of above 95% of the lowest transmittance was evaluated as "A" (good), and the case of below 95% were evaluated as "B" (no-good). The results are shown in Table 3.

(4) Evaluation of Heat Resistance

The substrate, on which the coating film had been formed in (2) described above, was used and heated for 1 hour on a hot plate of 250° C. and heat resistance was evaluated based on a change rate of the film thickness (residual film rate) of before and after heating. The case of above 95% of residual film rate was evaluated as "A" (good), and the case of below 95% were evaluated as "B" (no-good). The results are shown in Table 3.

(5) Evaluation of Hardness

The coating film, formed in (2) described above, was measured for pencil hardness in accordance with Pencil Scratch Test of JIS K-5400-1990 8.4.1. Surface hardness was evaluated by judging from scratch damages of the coating film. The results are shown in Table 3.

(6) Evaluation of Adhesion

The coating film, formed in (2) described above, was subjected to a tape peeling test in accordance with JIS D-0202. The case of below 5% of peeling was evaluated as "A" (good), and the case of above 5% were evaluated as "B" (no-good). The results are shown in Table 3.

(7) Evaluation of Storage Stability

The thermosetting resin composition H-1, prepared in (1) described above, was heated in an oven of 40° C. for 200 hours, and storage stability was evaluated based on viscosity change of before and after heating. The case of viscosity increase rate of below 10% was evaluated as "A" (good) and the case of above 10% was evaluated as "B" (no-good). The results are shown in Table 3.

Example 22

A thermosetting resin composition [H-2] was prepared in the same manner as Example 21 except that the polymer solution containing the copolymer [A-2] obtained in Synthesis Example 2 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a thermoset film which was evaluated. The results are shown in Table 3.

Example 23

A thermosetting resin composition [H-3] was prepared in the same manner as Example 21 except that the polymer solution containing the copolymer [A-3] obtained in Synthesis Example 3 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a thermoset film which was evaluated. The results are shown in Table 3.

Example 24

A thermosetting resin composition [H-4] was prepared in the same manner as Example 21 except that the polymer solution containing the copolymer [A-4] obtained in Synthesis Example 4 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a thermoset film which was evaluated. The results are shown in Table 3.

Example 25

A thermosetting resin composition [H-5] was prepared in the same manner as Example 21 except that the polymer solution containing the copolymer [A-5] obtained in Synthesis Example 5 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a thermoset film which was evaluated. The results are shown in Table 3.

Example 26

A thermosetting resin composition [H-6] was prepared in the same manner as Example 21 except that the polymer solution containing the copolymer [A-6] obtained in Synthesis Example 6 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a thermoset film which was evaluated. The results are shown in Table 3.

Example 27

A thermosetting resin composition [H-7] was prepared in the same manner as Example 21 except that the polymer solution containing the copolymer [A-7] obtained in Synthesis Example 7 was used in place of the polymer solution containing the copolymer [A-1] obtained in Synthesis Example 1 and propylene glycol monomethyl ether acetate was used in place of the solvent of diethylene glycol dimethyl ether used to decompose the solid content, and was then used to form a thermoset film which was evaluated. The results are shown in Table 3.

Example 28

A thermosetting resin composition [H-8] was prepared in the same manner as Example 21 except that the polymer solution containing the copolymer [A-8] obtained in Synthesis Example 8 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a thermoset film which was evaluated. The results are shown in Table 3.

Example 29

A thermosetting resin composition [H-9] was prepared in the same manner as Example 21 except that the polymer solution containing the copolymer [A-9] obtained in Synthesis Example 9 was used in place of the polymer solution containing the copolymer [A-1] obtained in Synthesis Example 1 and ethyl 3-ethoxypropionate was used in place of the solvent of diethylene glycol dimethyl ether used to decompose the solid content, and was then used to form a thermoset film which was evaluated. The results are shown in Table 3.

Example 30

A thermosetting resin composition [H-10] was prepared in the same manner as Example 21 except that the polymer solution containing the copolymer [A-10] obtained in Synthesis Example 10 was used in place of the polymer solution containing the copolymer [A-1] obtained in Synthesis Example 1 and methyl 3-methoxypropionate was used in place of the solvent of diethylene glycol dimethyl ether used to decompose the solid content, and was then used to form a thermoset film which was evaluated. The results are shown in Table 3.

Comparative Example 5

A thermosetting resin composition [H-2R] was prepared in the same manner as Example 22 except that the polymer solution containing the copolymer [A-2R] obtained in Comparative Synthesis Example 2 was used in place of the polymer solution containing the copolymer [A-2] obtained in Synthesis Example 2, and was then used to form a thermoset film which was evaluated. The results are shown in Table 3.

Comparative Example 6

A thermosetting resin composition [H-3R] was prepared in the same manner as Example 26 except that the polymer solution containing the copolymer [A-3R] obtained in Comparative Synthesis Example 3 was used in place of the polymer solution containing the copolymer [A-6] obtained in Synthesis Example 6, and was then used to form a thermoset film which was evaluated. The results are shown in Table 3.

TABLE 3

| | Trans-parency | Heat Resistance | Pencil Hardness | Adhesion | Storage Stability |
|---|---|---|---|---|---|
| Example 21 | A | A | 4H | A | A |
| Example 22 | A | A | 4H | A | A |
| Example 23 | A | A | 4H | A | A |
| Example 24 | A | A | 4H | A | A |
| Example 25 | A | A | 4H | A | A |
| Example 26 | A | A | 4H | A | A |
| Example 27 | A | A | 4H | A | A |
| Example 28 | A | A | 4H | A | A |
| Example 29 | A | A | 4H | A | A |
| Example 30 | A | A | 4H | A | A |
| Comparative Example 5 | A | A | 4H | A | B |
| Comparative Example 6 | A | A | 4H | A | B |

In addition, the specific embodiments and examples described in Best Mode For Carrying Out the Invention are no more than for the purpose to make clear the technical content of the present invention, the present invention should not be narrowly interpreted by limiting to the specific examples, and those skilled in the art will carry out the present invention while making changes to them within the scope of the present invention and attached claims.

The invention claimed is:

1. A resin composition, comprising a copolymer [A] and an organic solvent [B], the copolymer [A] comprising an epoxy group and a carboxyl group, and having a constitutional component derived from (a1) and a constitutional component derived from (a2) below:
(a1) a reaction mixture between at least one of an ethylenically unsaturated carboxylic acid and an ethylenically unsaturated carboxylic acid anhydride and at least one reactive compound selected from the group consisting of the compounds represented by general formulae (I), (II) and (III) below,

$R^1$—O—$R^3$—O—$R^2$   (I)

wherein, $R^1$ and $R^2$ each independently represent an alkyl group having 1 to 4 carbon atoms, and $R^3$ represents a linear hydrocarbon group having 2 to 4 carbon atoms which does not contain an oxygen atom, or a linear or branched hydrocarbon group having 2 to 4 carbon atoms which contains an oxygen atom,

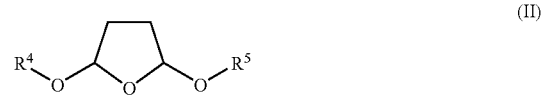
(II)

wherein, $R^4$ and $R^5$ each independently represent an alkyl group having 1 to 4 carbon atoms,

(III)

wherein, $R^6$ and $R^7$ each independently represent an alkyl group having 1 to 4 carbon atoms, and $R^8$ represents a hydrogen atom or an alkyl group having 1 to 4 carbon atoms; and
(a2) at least one epoxidized ethylenically-unsaturated compound selected from the group consisting of glycidyl acrylate, 2-methyl glycidyl acrylate, 3,4-epoxy butyl acrylate, 6,7-epoxy heptyl acrylate, glycidyl methacrylate, 2-methyl glycidyl methacrylate, 3,4-epoxy butyl methacrylate, 6,7-epoxy heptyl methacrylate, α-glycidyl ethyl acrylate, α-n-glycidyl propyl acrylate, α-n-butyl acryl glycidyl, α-ethyl acrylate 6,7-epoxyheptyl, o-vinyl benzyl glycidyl ether, m-vinyl benzyl glycidyl ether and p-vinyl benzyl glycidyl ether.

2. The resin composition according to claim 1, further comprising a constitutional component derived from an ethylenically unsaturated compound (a3) other than (a1) and (a2).

3. The resin composition according to claim 1, further comprising a polymerizable compound having an ethylenically unsaturated bond [C] and a radiation-sensitive polymerization initiator [D].

4. The resin composition according to claim 1, further comprising a radiation-sensitive acid generator [E].

5. The resin composition according to claim 1, wherein the organic solvent [B] is at least one selected from the group consisting of hydroxy-carboxylate ester, alkoxy-carboxylate ester, ethylene glycol alkyl ether, diethylene glycol alkyl ether, propylene glycol monoalkyl ether, and propylene glycol ether ester.

6. The resin composition according to claim 1, wherein the copolymer [A] is produced by a process including:
    a reaction step to obtain a reaction mixture (a1) by reacting at least one of the ethylenically unsaturated carboxylic acid and the ethylenically unsaturated carboxylic acid anhydride with at least one reactive compound selected from the group consisting of the compounds expressed by above general formulae (I), (II) and (III); and
    a polymerization step to copolymerize the resulting reaction mixture (a1) with the epoxidized ethylenically-unsaturated compound (a2).

7. The resin composition according to claim 1, wherein the reaction mixture (a1) is produced by reacting at least one of the ethylenically unsaturated carboxylic acid and the ethylenically unsaturated carboxylic acid anhydride with at least one reactive compound selected from the group consisting of the compounds expressed by above general formulae (I), (II) and (III) within a temperature range of 60° C. to 150° C.

8. The resin composition according to claim 7, wherein the reaction mixture (a1) is produced by reacting at least one of the ethylenically unsaturated carboxylic acid and the ethylenically unsaturated carboxylic acid anhydride with at least one reactive compound selected from the group consisting of the compounds expressed by above general formulae (I), (II) and (III) at a mole ratio of 1:0.5 to 1:3.

* * * * *